United States Patent
Höglund et al.

(10) Patent No.: US 12,192,883 B2
(45) Date of Patent: Jan. 7, 2025

(54) METHODS AND NODES FOR COMMUNICATION USING PRECONFIGURED RESOURCE CONFIGURATIONS

(71) Applicant: Telefonaktiebolaget LM Ericsson (publ), Stockholm (SE)

(72) Inventors: Andreas Höglund, Solna (SE); Mattias Bergström, Sollentuna (SE); Magnus Stattin, Upplands Väsby (SE); Tuomas Tirronen, Helsinki (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 374 days.

(21) Appl. No.: 17/639,639

(22) PCT Filed: Sep. 4, 2020

(86) PCT No.: PCT/SE2020/050837
§ 371 (c)(1),
(2) Date: Mar. 2, 2022

(87) PCT Pub. No.: WO2021/045673
PCT Pub. Date: Mar. 11, 2021

(65) Prior Publication Data
US 2022/0295381 A1    Sep. 15, 2022

Related U.S. Application Data

(60) Provisional application No. 62/896,745, filed on Sep. 6, 2019.

(51) Int. Cl.
*H04W 48/10* (2009.01)
*H04J 3/06* (2006.01)
(Continued)

(52) U.S. Cl.
CPC ........ *H04W 48/10* (2013.01); *H04J 3/0661* (2013.01); *H04W 72/30* (2023.01)

(58) Field of Classification Search
CPC ...... H04W 48/10; H04W 72/30; H04J 3/0661
(Continued)

(56) References Cited

U.S. PATENT DOCUMENTS

2017/0118741 A1* 4/2017 Jung .................. H04W 72/23
2017/0245301 A1* 8/2017 Han .................. H04W 72/12
(Continued)

FOREIGN PATENT DOCUMENTS

| EP | 3217748 A1 | 9/2017 |
|---|---|---|
| WO | 2020065620 A1 | 4/2020 |
| WO | 2020225161 A1 | 11/2020 |

OTHER PUBLICATIONS

Samsung (R1-1908444, "Discussion on transmission in preconfigured UL resources for MTC", Aug. 26-30, 2019) (Year: 2019).*
(Continued)

*Primary Examiner* — Xuan Lu
(74) *Attorney, Agent, or Firm* — Murphy, Bilak & Homiller, PLLC

(57) ABSTRACT

The present disclosure relates to telecommunications. In one of its aspects, the disclosure concerns a method, performed by a User Equipment (UE), in a communications network. The method comprises receiving a broadcast from a base station. The broadcast comprises an indication indicating whether the UE is allowed to use a preconfigured resource configuration associated with the UE. The method further comprises determining, based on the indication in the broadcast, whether the UE is allowed to use the preconfigured resource configuration.

12 Claims, 16 Drawing Sheets

(51) Int. Cl.
*H04W 48/12* (2009.01)
*H04W 56/00* (2009.01)
*H04W 72/23* (2023.01)
*H04W 72/30* (2023.01)

(58) Field of Classification Search
USPC ......................................................... 370/329
See application file for complete search history.

(56) References Cited

U.S. PATENT DOCUMENTS

2017/0251353 A1* 8/2017 Pinheiro ............... H04W 48/02
2017/0303240 A1* 10/2017 Basu Mallick ....... H04W 72/02
2021/0243817 A1* 8/2021 Beale .................. H04W 56/004
2022/0038997 A1* 2/2022 Höglund ............... H04W 48/06

OTHER PUBLICATIONS

Ericsson, "Discussions on RRM requirements for transmissions using PUR for MTC", 3GPP TSG-RAN WG4 Meeting #90bis, R4-1904573, Xi'an, China, Apr. 8-12, 2019, 4 pages.
Bgpp, "3GPP TS 36.331 V15.2.2", 3rd Generation Partnership Project; Technical Specification Group Radio Access Network; Evolved Universal Terrestrial Radio Access (E-UTRA); Radio Resource Control (RRC); Protocol specification (Release 15), Jun. 2018, 1-791.
Futurewei, "Feature lead summary of Support for transmission in preconfigured UL resources", 3GPP TSG RAN WG1 Meeting #98, R1-1909556, Prague, Czech Republic, Aug. 26-30, 2019, 1-25.
Huawei, et al., "Feature lead summary of Support for transmission in preconfigured UL resources", 3GPP TSG RAN WG1 Meeting #95, R1-1813717, Spokane, USA, Nov. 12-16, 2018, 1-20.
Samsung, "Discussion on transmission in preconfigured UL resources for NB-IoT", 3GPP TSG RAN WG1 Meeting #95, R1-1812947, Spokane, USA, Nov. 12-16, 2018, 1-6.
Ericsson, "Revised WID: Additional MTC enhancements for LTE", 3GPP TSG RAN Meeting #81 RP-181878, Gold Coast, Australia, Sep. 10-13, 2018, 1-4.
Huawei, "WID revision: Additional enhancements for NB-IoT", 3GPP TSG RAN meeting #81 RP-181674, Gold Coast, Australia, Sep. 10-13, 2018, 1-4.
"Discussion on transmission in preconfigured UL resources for MTC", 3GPP TSG RAN WG1 #98, R1-1908444, Samsung, Prague, CZ, Aug. 26-30, 2019, 5 pages.
"Discussion on transmission in preconfigured UL resources for NB-IoT", 3GPP TSG RAN WG1 Meeting #97, R1-1906897, Samsung, Reno, USA, May 13-17, 2019, 5 pages.
"UL transmission in preconfigured resources for NBIoT", 3GPP TSG RAN WG1 Meeting #98, R1-1908728, Lenovo, Motorola Mobility, Prague, CZ, Aug. 26-30, 2019, 5 pages.
"Transmission in preconfigured UL resources", 3GPP TSG RAN WG1 Meeting #94; R1-1808348; Gothenburg, Sweden, Aug. 20-24, 2018, pp. 1-4.

* cited by examiner

502
Responsive to receiving a broadcast from a base station, wherein the broadcast comprises an indication that the wireless device is not allowed to use a preconfigured resource configuration associated with the wireless device, determining that the wireless device is not allowed to use the preconfigured resource configuration.

Fig. 5

602
Responsive to an event indicating that the base station should dis-allow any preconfigured resource configurations established prior to the indication, transmitting a broadcast from a base station, wherein the broadcast comprises an indication that the wireless device is not allowed to use a preconfigured resource configuration associated with the wireless device.

Fig. 6

METHODS AND NODES FOR COMMUNICATION USING PRECONFIGURED RESOURCE CONFIGURATIONS

TECHNICAL FIELD

The present disclosure relates to base stations, User Equipment (UEs), and methods performed therein, operating in a communications network. Particular embodiments relate to determining whether a UE is allowed to use a preconfigured resource configuration.

BACKGROUND

There has been a lot of work in 3GPP direct towards specifying technologies to cover Machine-to-Machine (M2M) and/or Internet of Things (IoT) related use cases. Most recent work for 3GPP Releases 13, 14 and 15 include enhancements to support Machine-Type Communications (MTC) with new User Equipment (UE or wireless device) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

The LTE enhancements introduced in 3GPP Release 13, 14, and 15 for MTC will here be referred to as "eMTC" or "LTE-M", including (not limiting) support for bandwidth limited UEs, Cat-M1, and support for coverage enhancements. This is to separate discussions from NB-IoT (notation here used for any Release), although the supported features are similar on a general level.

For both eMTC and NB-IoT, 'Cellular Internet of Things (CIoT) Evolved Packet System (EPS) User Plane (UP) optimization' and 'CIoT EPS Control Plane (CP) optimization' signaling reductions were also introduced in Rel-13. The former, here referred to as UP-solution, allows a UE to resume a previously stored Radio Resource Control (RRC) connection, thus also known as RRC Suspend/Resume. The latter, here referred to as CP-solution, allows the transmission of user-plane data over NAS, aka DoNAS.

There are multiple differences between "legacy" LTE and the procedures and channels defined for eMTC and for NB-IoT. Some important differences include a new physical channel, such as the physical downlink control channels, called MPDCCH in eMTC and NPDCCH in NB-IoT, and a new physical random access channel, NPRACH, for NB-IoT. Another important difference is the coverage level, also known as coverage enhancement level, that these technologies can support. By applying repetitions to the transmitted signals and channels, both eMTC and NB-IoT allow UE operation down to much lower Signal to Noise Ratio (SNR) level compared to LTE, i.e. Es/Iot≥−15 dB being the lowest operating point for eMTC and NB-IoT which can be compared to −6 dB Es/IoT for "legacy" LTE.

The Rel-16 Work Item Descriptions for LTE-M [LTE-M-WID] and NB-IoT [NB-IoT-WID] contain a common objective on improving the uplink transmission efficiency and/or UE power consumption by means of transmission in preconfigured resources, in particular:
Improved UL Transmission Efficiency and/or UE Power Consumption:
  Specify support for transmission in preconfigured resources in idle and/or connected mode based on SC-FDMA waveform for UEs with a valid timing advance [RAN1, RAN2, RAN4]
    Both shared resources and dedicated resources can be discussed
    Note: This is limited to orthogonal (multi) access schemes
  This preconfigured uplink resource (PUR) solution may depend on the final outcome of 3GPP Rel-16.

SUMMARY

There currently exist certain challenge(s). In legacy operation, User Equipment (UEs or wireless devices) remain in an idle mode of operation, e.g. RRC_IDLE, most of the time and move to a connected mode of operation, e.g. RRC_CONNECTED, during relatively short time periods in order to transmit data. The base station, e.g. eNB, may be unaware of exactly which idle UEs are in its cells, but as soon as the UE enters a connected mode of operation, the base station may be fully aware of the UE and in full control of the radio resources that the UE uses for transmission.

Preconfigured Uplink Resource (PUR) is introducing long-term radio resource assignment to UEs in an idle mode operation, e.g. RRC_IDLE, and data transmission from these devices while they still remain in the idle mode of operation, e.g. RRC_IDLE. This is introducing a completely new problem since if the base station is reset for some reason (due to e.g. malfunction, temporary power off, software update, etc.) it may not be aware of any old PUR configurations but all UEs with previously configured PURs may continue transmitting, which may cause blocking and interference and therefore potentially a strong negative impact on uplink system performance.

Certain aspects of the present disclosure and their embodiments may provide solutions to these or other challenges. Embodiments described herein provide a mechanism for the network to invalidate, or dis-allow, old PUR configurations to avoid the problem above. That is, embodiments described herein provide a network protection mechanism to avoid interference from outdated PUR configurations.

According to a first aspect of the present disclosure, this is achieved by a method performed by a User Equipment, UE, in a communications network. The method comprises receiving a broadcast from a base station. The broadcast comprises an indication indicating whether the UE is allowed to use a preconfigured resource configuration associated with the UE. The method further comprises determining, based on the indication in the broadcast, whether the UE is allowed to use the preconfigured resource configuration.

In some embodiments, the indication indicating whether the UE is allowed to use the preconfigured resource configuration associated with the UE is a first broadcasted control value. The step of determining whether the UE is allowed to use the preconfigured resource configuration further comprises comparing the first broadcasted control value to a first control value. The first control value may be a control value stored in the UE. Based on the comparison, it is determined whether the UE is allowed to use the preconfigured resource configuration associated with the UE. The first broadcast may comprise a system information broadcast.

In some embodiments, the method comprises determining whether the first control value matches the first broadcasted control value, and responsive to the first control value not matching the first broadcasted control value, determining that the UE is not allowed to use the preconfigured resource configuration.

In some embodiments, the first broadcasted control value comprises a bit string.

In some embodiments, the first broadcasted control value comprises a first time stamp value and the first control value comprises a second time stamp value. The method comprises determining whether the second time stamp value is newer than, or equal to, the first time stamp value, and responsive to the second time stamp value being older than the first time stamp value, determining that the UE is not allowed to use the preconfigured resource configuration.

In some embodiments, the method further comprises, upon configuration of the preconfigured resource configuration, setting the first control value as equivalent to a most recently received broadcasted control value or setting the first control value as a most recently broadcasted control value received as part of the preconfigured resource configuration.

In some embodiments, the method further comprises, responsive to determining that the UE is not allowed to use the preconfigured resource configuration, transmitting an indication to the network that the preconfigured resource configuration has been dis-allowed.

In some embodiments, the indication in the received broadcast indicates that the UE is not allowed to use the preconfigured resource configuration associated with the UE. Then, the step of determining whether the UE is allowed to use the preconfigured resource configuration comprises determining that the UE is not allowed to use the preconfigured resource configuration. The indication may comprise a broadcasted flag indicating that the UE is not allowed to use the preconfigured resource configuration. Alternatively, the indication may comprise an absence of an indication that access to the base station by idle or inactive UEs using preconfigured resource configurations is enabled.

In some embodiments, the preconfigured resource configuration comprises a preconfigured uplink resource configuration.

In some embodiments, the UE is operating in an idle mode of operation in Long Term Evolution (LTE) or in an inactive mode of operation in New Radio (NR). In one embodiment a 'PUR valueTag' is utilized and in another embodiment a 'PUR time stamp' is utilized, which is broadcast by the base station, e.g. in system information. Access with a PUR configuration may only be allowed after successful comparison of the broadcasted value with a parameter stored in the UE.

According to a second aspect of the present disclosure, the object of the disclosure is achieved by a method performed by a base station for communicating with a UE. The UE is configured to use a preconfigured resource configuration. The method comprises, responsive to an event indicating that the base station should dis-allow any preconfigured resource configurations established prior to the indication, broadcasting an indication indicating that the UE is not allowed to use the preconfigured resource configuration associated with the UE.

In some embodiments, the method further comprises, responsive to the event indicating that the base station should dis-allow any preconfigured resource configurations established prior to the indication, updating the broadcasted control value. The broadcasted indication is the updated control value. The broadcasted control value may be broadcast as part of a system information broadcast.

In some embodiments, the broadcasted control value comprises a bit string of length N, where N is an integer. In some of these embodiments, the method may further comprise storing a broadcasted control value in a non-volatile memory. The step of updating the broadcasted control value may comprise setting the updated broadcasted control value to a value, which is different from the stored broadcasted control value. In other of these embodiments, the method may further comprise transmitting a broadcasted control value to a network node for storage. The step of updating the broadcasted control value may comprises retrieving the broadcasted control value from the network node, and setting the updated broadcasted control value to a value, which is different from the stored broadcasted control value. In still other of these embodiments, the step of updating the broadcasted control value may comprise selecting a random bit string of length N for the updated broadcasted control value.

In some embodiments, the broadcasted control value comprises a time stamp value and the updated broadcasted control value comprises a current time stamp value based on a time at which the event occurs.

In some embodiments, the method further comprises, upon configuration of the preconfigured resource configuration, providing a most recently broadcasted control value as part of the preconfigured resource configuration.

In some embodiments, the indication comprises a broadcasted flag indicating that the UE is not allowed to use the preconfigured resource configuration. The indication may comprise an absence of an indication that access to the base station by idle or inactive UEs using preconfigured resource configurations is enabled.

In some embodiments, the event comprises the base station restarting. In other embodiments, the event comprises the base station losing record of previous preconfigured resource configurations.

In some embodiments, the preconfigured resource configuration comprises a preconfigured uplink resource configuration.

According to a third aspect of the present disclosure, the object of the disclosure is achieved by a UE in a communications network, wherein the UE is configured to perform the method according to the first aspect.

The UE is configured to receive a broadcast from a base station. The broadcast comprises an indication indicating whether the UE is allowed to use a preconfigured resource configuration associated with the UE. The UE is further configured to determine, based on the indication in the broadcast, whether the UE is allowed to use the preconfigured resource configuration.

In some embodiments, the indication indicating whether the UE is allowed to use the preconfigured resource configuration associated with the UE is a first broadcasted control value. The UE is then configured to determine whether the UE is allowed to use the preconfigured resource configuration by comparing the first broadcasted control value to a first control value. The first control value may be a control value stored in the UE. Based on the comparison, it is determined whether the UE is allowed to use the preconfigured resource configuration associated with the UE. The first broadcast may comprise a system information broadcast.

In some embodiments, the UE is configured to determine whether the first control value matches the first broadcasted control value, and responsive to the first control value not matching the first broadcasted control value, the UE is configured to determine that the UE is not allowed to use the preconfigured resource configuration. The first broadcasted control value may comprise a bit string.

In some embodiments, the first broadcasted control value comprises a first time stamp value and the first control value comprises a second time stamp value. The UE is configured to determine whether the second time stamp value is newer than, or equal to, the first time stamp value, and responsive to the second time stamp value being older than the first time stamp value, the UE is configured to determine that the UE is not allowed to use the preconfigured resource configuration.

In some embodiments, the UE is further configured to, upon configuration of the preconfigured resource configuration, setting the first control value as equivalent to a most recently received broadcasted control value or setting the first control value as a most recently broadcasted control value received as part of the preconfigured resource configuration.

In some embodiments, the UE is further configured to, responsive to determining that the UE is not allowed to use the preconfigured resource configuration, transmitting an indication to the network that the preconfigured resource configuration has been dis-allowed.

In some embodiments, the indication in the received broadcast indicates that the UE is not allowed to use the preconfigured resource configuration associated with the UE. Then, the UE is configured to determine whether the UE is allowed to use the preconfigured resource configuration by determining that the UE is not allowed to use the preconfigured resource configuration. The indication may comprise a broadcasted flag indicating that the UE is not allowed to use the preconfigured resource configuration. Alternatively, the indication may comprise an absence of an indication that access to the base station by idle or inactive UEs using preconfigured resource configurations is enabled.

In some embodiments, the preconfigured resource configuration comprises a preconfigured uplink resource configuration.

In some embodiments, the UE is operating in an idle mode of operation in Long Term Evolution (LTE) or in an inactive mode of operation in New Radio (NR).

According to a fourth aspect of the present disclosure, the object of the disclosure is achieved by a base station for communicating with a UE, wherein the UE is configured to use a preconfigured resource configuration and the base station is configured to perform the method according to the second aspect.

The base station is configured to, responsive to an event indicating that the base station should dis-allow any preconfigured resource configurations established prior to the indication, broadcast an indication indicating that the UE is not allowed to use the preconfigured resource configuration associated with the UE.

In some embodiments, the base station is further configured to, responsive to the event indicating that the base station should dis-allow any preconfigured resource configurations established prior to the indication, update the broadcasted control value. The broadcasted indication is the updated control value. The broadcasted control value may be broadcast as part of a system information broadcast.

In some embodiments, the broadcasted control value comprises a bit string of length N, where N is an integer. In some of these embodiments, the base station may further be configured to store a broadcasted control value in a non-volatile memory. The base station may be configured to update the broadcasted control value by setting the updated broadcasted control value to a value, which is different from the stored broadcasted control value. In other of these embodiments, the base station may further be configured to transmit a broadcasted control value to a network node for storage. The base station may be configured to update the broadcasted control value by retrieving the broadcasted control value from the network node, and setting the updated broadcasted control value to a value, which is different from the stored broadcasted control value. In still other of these embodiments, the base station may be configured to update the broadcasted control value by selecting a random bit string of length N for the updated broadcasted control value.

In some embodiments, the broadcasted control value comprises a time stamp value and the updated broadcasted control value comprises a current time stamp value based on a time at which the event occurs.

In some embodiments, the base station is further configured to, upon configuration of the preconfigured resource configuration; provide a most recently broadcasted control value as part of the preconfigured resource configuration.

In some embodiments, the indication comprises a broadcasted flag indicating that the UE is not allowed to use the preconfigured resource configuration. The indication may comprise an absence of an indication that access to the base station by idle or inactive UEs using preconfigured resource configurations is enabled.

In some embodiments, the event comprises the base station restarting. In other embodiments, the event comprises the base station losing record of previous preconfigured resource configurations.

In some embodiments, the preconfigured resource configuration comprises a preconfigured uplink resource configuration.

According to a fifth aspect of the present disclosure, the object is achieved by a computer program comprising instructions, which when executed by a processor, causes the processor to perform actions according to any of the methods according to the first and second aspects.

According to a sixth aspect of the present disclosure, the object is achieved by a carrier comprising the computer program of the fifth aspect, wherein the carrier is one of an electronic signal, an optical signal, an electromagnetic signal, a magnetic signal, an electric signal, a radio signal, a microwave signal, or a computer-readable storage medium.

There are, proposed herein, various embodiments which address one or more of the issues disclosed herein.

One of the benefits of the solution is that interfering uplink transmissions from UEs with previously configured PUR configurations are removed, or at least reduced.

The embodiments herein are not limited to the features and advantage mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which:

FIG. 5 is a flowchart according to embodiments herein.

FIG. 6 is a flowchart according to embodiments herein.

The drawings are not necessarily to scale and the dimensions of certain features may have been exaggerated for the sake of clarity. Emphasis is instead placed upon illustrating the principle of the embodiments herein.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1A:
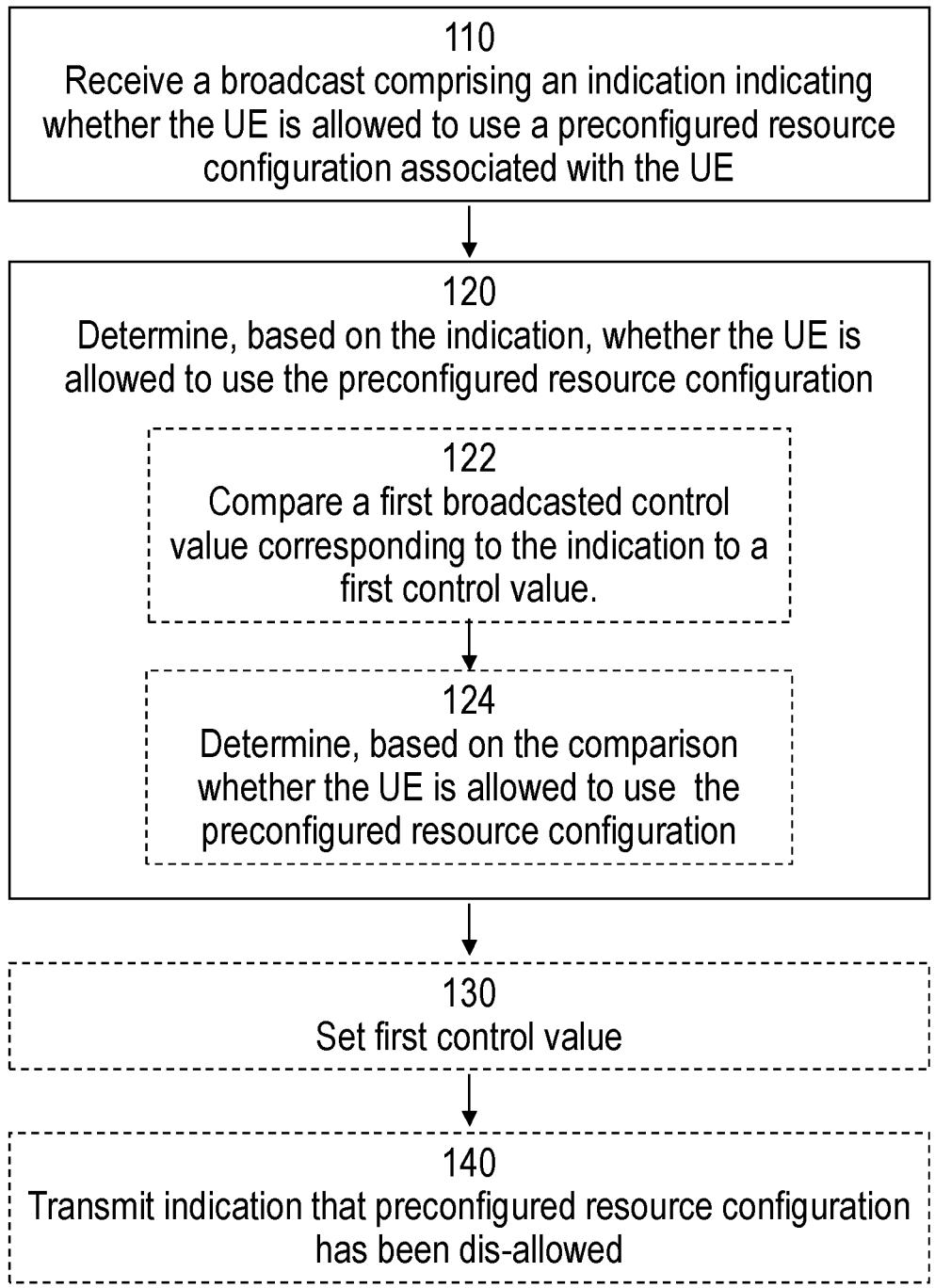
FIGS. 1a-b are flowcharts according to embodiments herein.
Figure 1B:
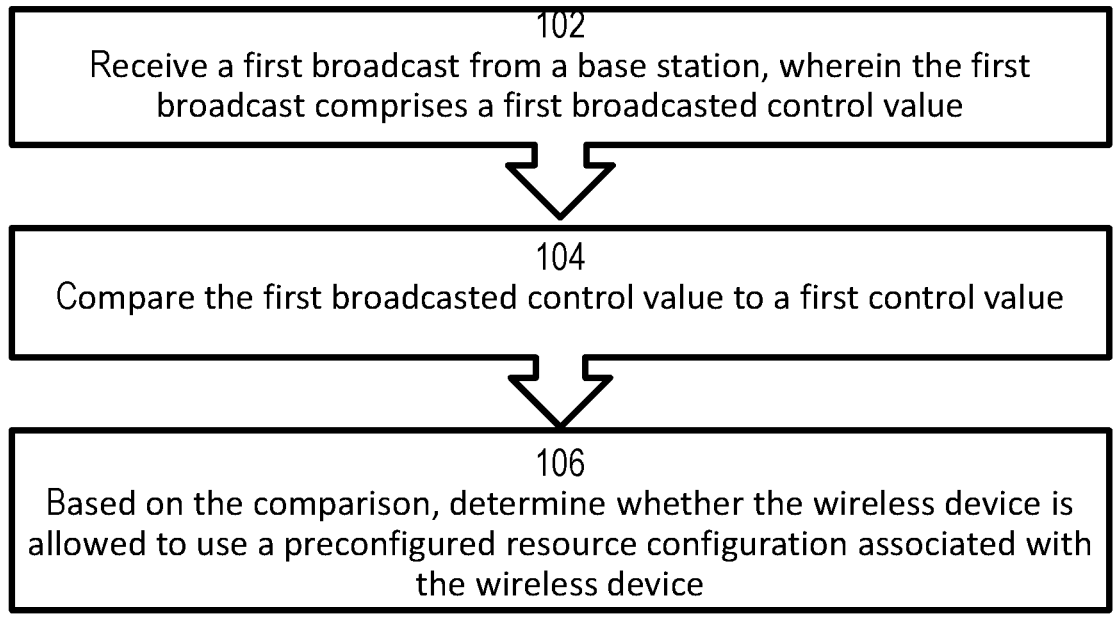

FIGS. 1*a* and 1*b* are flowcharts according to embodiments herein and depict a method 100 in accordance with particular embodiments. The method 100 may be performed by a wireless device or a User Equipment (UE), in a communications network. As illustrated in FIG. 1*a*, the method 100 begins at step 110 with receiving a broadcast from a base station. The broadcast comprises an indication indicating whether the UE is allowed to use a preconfigured resource configuration associated with the UE. The method 100 further comprises step 120 of determining, based on the indication in the broadcast, whether the UE is allowed to use the preconfigured resource configuration. The preconfigured resource configuration may comprise, for example, a preconfigured uplink resource configuration. The UE may be operating in an idle mode of operation in Long Term Evolution (LTE) or in an inactive mode of operation in New Radio (NR).

In some embodiments, the indication in the received broadcast indicates that the UE is not allowed to use the preconfigured resource configuration associated with the UE. Then, the step 120 of determining whether the UE is allowed to use the preconfigured resource configuration may comprise determining that the UE is not allowed to use the preconfigured resource configuration. The indication may comprise, for example, a broadcasted flag indicating that the UE is not allowed to use the preconfigured resource configuration. Alternatively, the indication may comprise, for example, an absence of an indication that access to the base station by idle or inactive UEs using preconfigured resource configurations is enabled.

In some embodiments, the indication indicating whether the UE is allowed to use the preconfigured resource configuration associated with the UE may be a first broadcasted control value. The step 120 of determining whether the UE is allowed to use the preconfigured resource configuration may then further comprise step 122 of comparing the first broadcasted control value to a first control value. The first control value is a control value stored in the UE. Thereafter, the method 100 continues with step 124, wherein, based on the comparison, it is determined whether the UE is allowed to use the preconfigured resource configuration associated with the UE. The first broadcast may comprise, for example, a system information broadcast. In embodiments where it is determined that the UE is not allowed to use the preconfigured resource configuration, the method 100 may further comprise step 140 of transmitting an indication to the network that the preconfigured resource configuration has been dis-allowed.

In some embodiments, the step 122 of comparing the first broadcasted control value to a first control value may comprise determining whether the first control value matches the first broadcasted control value. Responsive to the first control value not matching the first broadcasted control value, the step 124 of determining whether the UE is allowed to use the preconfigured resource configuration associated with the UE may comprise determining that the UE is not allowed to use the preconfigured resource configuration. The first broadcasted control value may comprise a bit string in such embodiments.

In other embodiments, the first broadcasted control value may comprise a first time stamp value and the first control value may comprise a second time stamp value. In these embodiments, the step 122 of comparing the first broadcasted control value to a first control value may comprise determining whether the second time stamp value is newer than, or equal to, the first time stamp value. Responsive to the second time stamp value being older than the first time stamp value, the step 124 of determining whether the UE is allowed to use the preconfigured resource configuration associated with the UE may comprise determining that the UE is not allowed to use the preconfigured resource configuration.

The method 100 may further comprise, upon configuration of the preconfigured resource configuration, step 130 of setting the first control value as equivalent to a most recently received broadcasted control value or setting the first control value as a most recently broadcasted control value received as part of the preconfigured resource configuration. Step 130 of setting the first control value here means that the first control value is updated to be equivalent to a most recently received broadcasted control value or a most recently broadcasted control value received as part of the preconfigured resource configuration. In the embodiments when the broadcasted control value comprises a time stamp, the first control value may be set to the time the UE was configured with the preconfigured resource configuration.

An example embodiment of the previously described method 100 is illustrated in FIG. 1*b*. The method 100 may begin with step 102 of receiving a first broadcast from a base station, wherein the first broadcast comprises a first broadcasted control value. This corresponds to step 110 in FIG. 1*a*. In step 104 the method 100 may comprise comparing the first broadcasted control value to a first control value. This corresponds to step 122 in FIG. 1*a*. In step 106, the method 100 may comprise based on the comparison, determining whether the wireless device is allowed to use a preconfigured resource configuration associated with the wireless device. Step 106 in FIG. 1b corresponds to step 124 in FIG. 1a. The first broadcast may comprise a system information broadcast. The wireless device may be operating in an idle mode of operation.

Figure 2B:
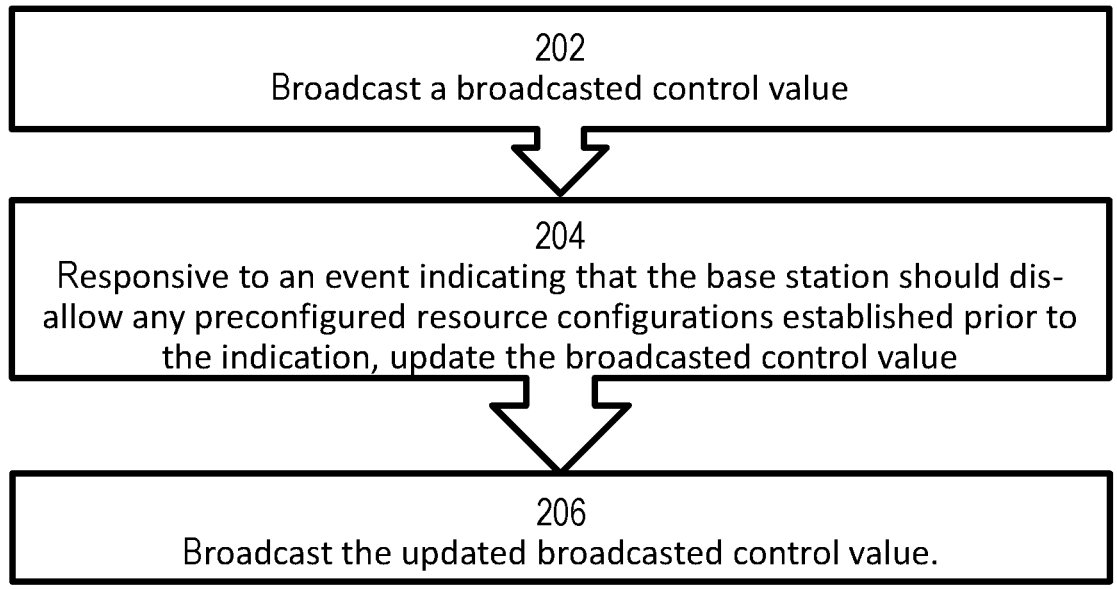
FIGS. 2a-b are flowcharts according to embodiments herein.
Figure 2A:
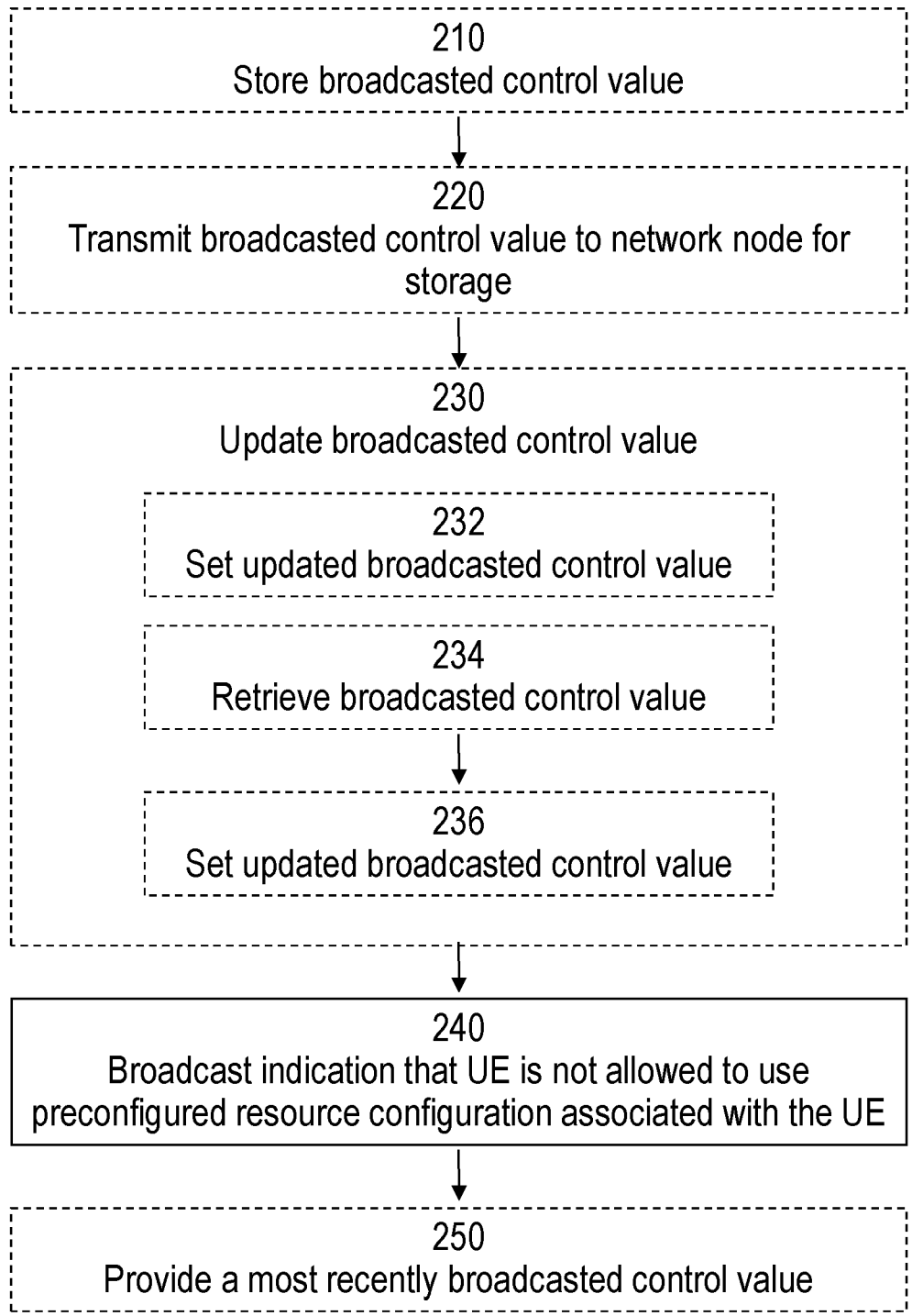

FIGS. 2a and 2b are flowcharts according to embodiments herein and depict a method 200 in accordance with particular embodiments. The method 200 may be performed by a base station for communicating with a UE, wherein the UE is configured to use a preconfigured resource configuration. As illustrated in FIG. 2a, the method 200 comprises step 240 which include, responsive to an event indicating that the base station should dis-allow any preconfigured resource configurations established prior to the indication, broadcasting an indication indicating that the UE is not allowed to use the preconfigured resource configuration associated with the UE. The event may comprise, for example, the base station restarting or the base station losing record of previous preconfigured resource configurations.

As further seen in FIG. 2a, in some embodiments, the method 200 may further comprise step 230 wherein, responsive to the event indicating that the base station should dis-allow any preconfigured resource configurations established prior to the indication, updating the broadcasted control value. Thus, the broadcasted indication is the updated control value.

In embodiments where the broadcasted control value comprise a bit string of length N, where N is an integer, the method 200 may further comprise step 210 of storing the broadcasted control value in a non-volatile memory. The step 230 of updating the broadcasted control value may then comprise step 232 of setting the updated broadcasted control value to a value, which is different from the stored broadcasted control value. In other embodiments, the method 200 may further comprise step 220 of transmitting the broadcasted control value to a network node for storage. The step 230 of updating the broadcasted control value may then comprise step 234 of retrieving the broadcasted control value from the network node, and step 236 of setting the updated broadcasted control value to a value, which is different from the stored broadcasted control value. In still other embodiments, the step 230 of updating the broadcasted control value comprises selecting a random bit string of length N for the updated broadcasted control value.

In embodiments where the broadcasted control value comprises a time stamp value, the updated broadcasted control value may comprise a current time stamp value based on a time at which the event occurs.

In some embodiments, the method 200 may further comprise, upon configuration of the preconfigured resource configuration, step 250 of providing a most recently broadcasted control value as part of the preconfigured resource configuration.

FIG. 2b illustrates an example embodiment of the method 200 illustrated in FIG. 2a. As seen in FIG. 2b, the method 200 may begin at step 202 with broadcasting a broadcasted control value. In step 204, which corresponds to step 230 in FIG. 2a, the method 200 may comprise responsive to an event indicating that the base station should dis-allow any preconfigured resource configurations established prior to the indication, updating the broadcasted control value. In step 206, the method 200 may comprise broadcasting the updated broadcasted control value. Step 206 in FIG. 2b corresponds to step 240 in FIG. 2a. The preconfigured resource configuration may comprise a PUR configuration.

In some embodiments, step 106 of FIG. 1b may comprise determining whether the first control value matches the first broadcasted control value; and responsive to the first control value not matching the first broadcasted control value, determining that the wireless device is not allowed to use the preconfigured resource configuration. For example, in one embodiment the base station broadcasts a 'PUR valueTag' as the first broadcasted control value. The PUR valueTag may comprise a bit string of length N, where N is an integer value.

In step 204 of FIG. 2b, responsive to an event, for example, if the base station is restarted, loses the record of previous PUR configurations or simply want to disallow older PUR configurations, the base station may update the 'PUR valueTag' in step 206.

The wireless device, or UE, may be configured to store the 'PUR valueTag' at the time PUR was configured for the wireless device, or alternatively the 'PUR valueTag' may be an information element (IE) of the PUR configuration itself. For example, upon configuration of the preconfigured resource configuration, the wireless device, or UE, may set the first control value as equivalent to a most recently received broadcasted control value or may set the first control value as a most recently broadcasted control value received as part of the preconfigured resource configuration. The wireless device, or UE, may then determine that it is allowed to use the PUR configuration for transmission if the 'PUR valueTag' in the wireless device (e.g. the first control value) matches the one broadcast by the base station (e.g the first broadcasted control value).

However, in some embodiments, the base station, for example after restart, may be unaware of the value of the pervious 'PUR valueTag' that was broadcasted. One solution to this may be to set the value of N for the bit string used for the PUR valueTag relatively high and that a random value is picked for the new 'PUR valueTag'. Hence, the possibility of accidentally selection the same 'PUR valueTag' is minimized. Another solution may be that wireless devices include the 'PUR valueTag' which they were configured with in a PUR transmission.

Alternatively, the PUR valueTag may be stored in non-volatile memory. For example, the base station may be configured to store the broadcasted control value in a non-volatile memory. Step 204 of FIG. 2b may then comprise: setting the updated broadcasted control value to a value which is different from the stored broadcasted control value.

In still one alternative embodiment, the PUR valueTag may be reported or uploaded to some other node/storage function from which it can be retrieved upon restart. For example, the base station may be configured to transmit the broadcasted control value to a network node for storage. The step 204 of FIG. 2b may then comprise retrieving the broadcasted control value from the network node, and setting the updated broadcasted control value to a value which is different from the stored broadcasted control value.

It may be useful to report SI updates in general. If then the PUR valueTag is included, one only needs to make it possible for the Radio Access Network (RAN) to retrieve the previous PUR valueTag and/or SI and/or SI configuration. Alternatively, all the base stations PUR configurations may be stored in non-volatile memory or report/upload it to some other node/storage function from which it can be retrieved upon restart. However, without the value tag or similar solution, eNB would after restart have to release each PUR configuration sequentially using dedicated signaling which may be tedious.

As previously described, in some embodiments, the broadcasted control value may comprises a 'PUR time stamp', i.e. date and time information. The broadcasted control value may be broadcast as part of system information. In step 204 of FIG. 2b, the base station may therefore be configured to: responsive to the event, for example, if the base station is restarted, loses the record of previous PUR configurations or simply wants to disallow older PUR configurations, update the 'PUR time stamp'. It may be updated with, for example, the current time. In other words, the broadcast control value comprises a time stamp value and the updated broadcasted control value comprises a current time stamp value based on a time at which the event occurs.

In these embodiments, the wireless device may be configured to store the 'PUR time stamp' at the time the PUR configuration was configured at the wireless device, or alternatively the 'PUR time stamp' may be made an information element (IE) of the PUR configuration itself. In other words, the wireless device may be configured to, upon configuration of the preconfigured resource configuration, set the first control value as equivalent to a most recently received broadcasted control value or set the first control value as a most recently broadcasted control value received as part of the preconfigured resource configuration. In some examples, the base station may be configured to, upon configuration of the preconfigured resource configuration, providing a most recently broadcasted control value as part of the preconfigured resource configuration.

Accordingly, the broadcast control value may comprise a first time stamp value and the first control value may comprise a second time stamp value. In this example, the step 104 of FIG. 1b may comprise determining whether the second time stamp value is newer than, or equal to, the first time stamp value. Step 106 of FIG. 1b may then comprise, responsive to the first second time stamp value being older than the first time stamp value, determining that the wireless device is not allowed to use the preconfigured resource configuration. In other words, the wireless device, or UE, may only determine that it is allowed to use the preconfigured resource configuration if the 'PUR time stamp' in the UE is newer than or equal to the 'PUR time stamp' broadcast in system information by the base station.

Figure 3:
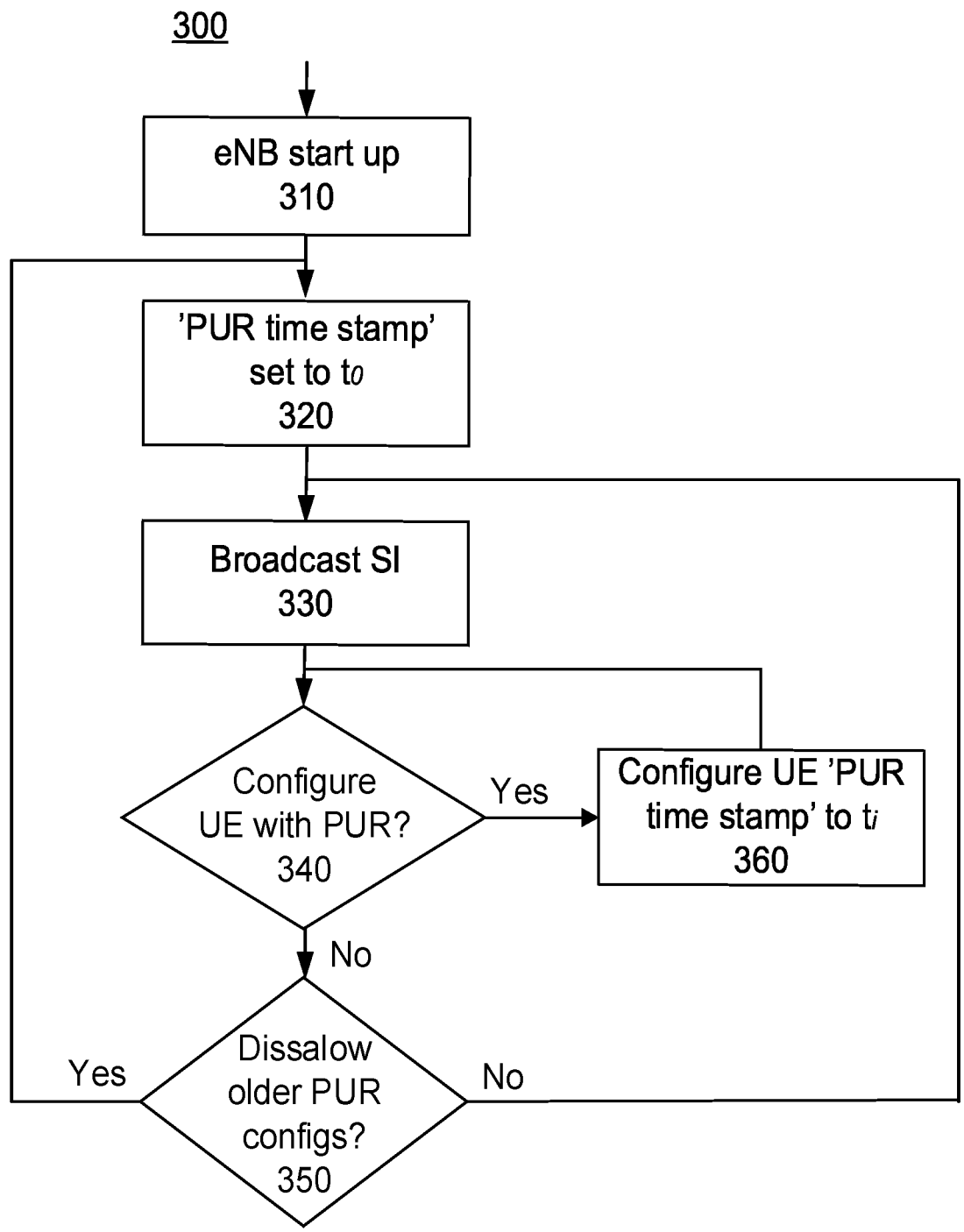
FIG. 3 is a flowchart of base station operation for the 'PUR time stamp' embodiment.

A flowchart of an example of the base station operation for the time stamp embodiment is illustrated in FIG. 3. In FIG. 3, the preconfigured resource configuration comprises a PUR configuration, but it may be appreciated that the preconfigured resource configuration is not limited to comprising a PUR configuration. As seen in FIG. 3, the eNB first starts up, action 310. The network 'PUR time stamp' is set to $t_0$ in action 320. SI is broadcasted, in 330. In 340, it is asked if configure UE with PUR? If yes, the UE 'PUR time stamp' is configured to $t_i$, action 360. If no, it is asked whether to disallow older PUR configurations in 350.

Figure 4:
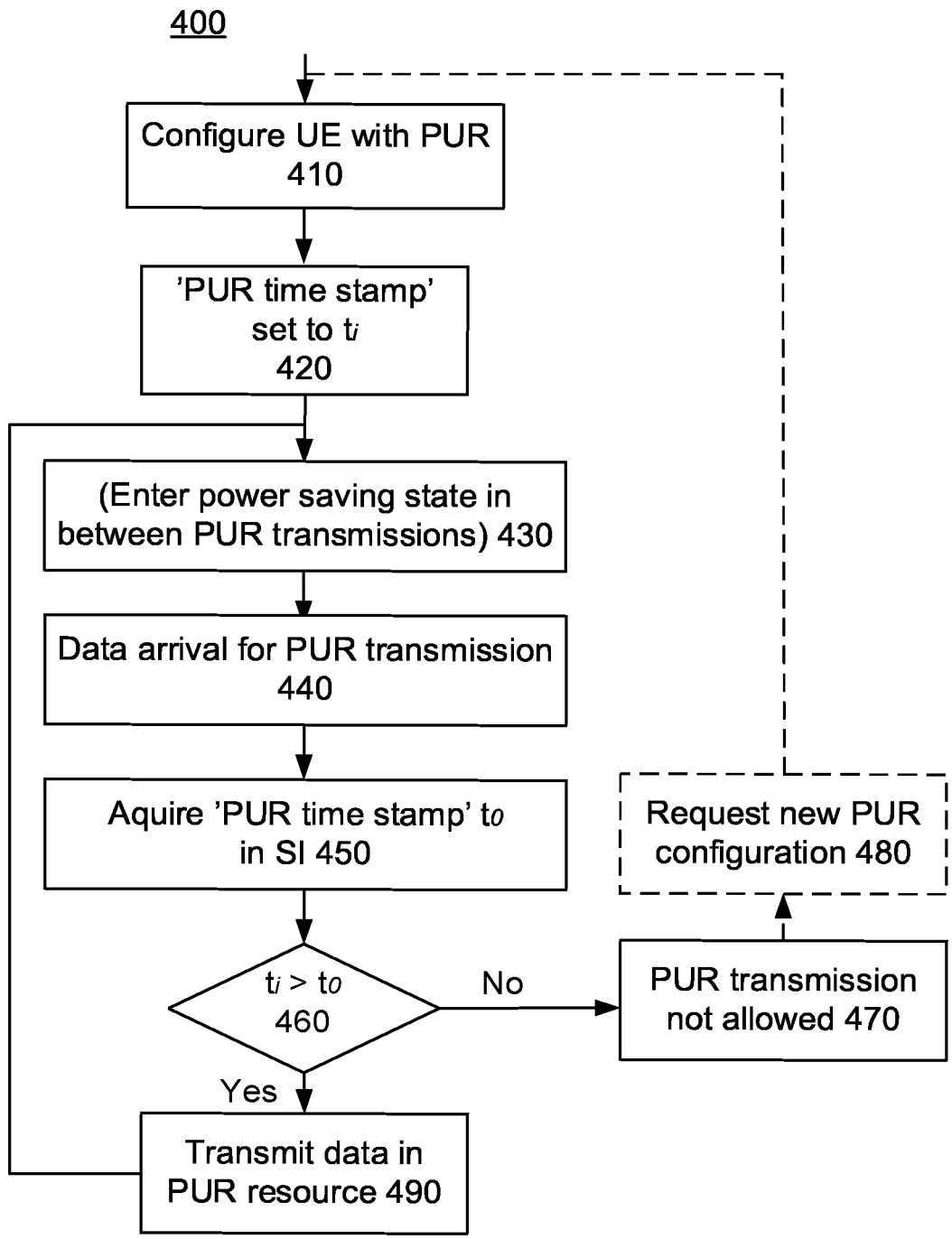
FIG. 4 is a flowchart of UE operation for the 'PUR time stamp' embodiment.

A flowchart of an example of the UE operation for the time stamp embodiment is illustrated in FIG. 4. In FIG. 4, the preconfigured resource configuration comprises a PUR configuration, but it may be appreciated that the preconfigured resource configuration is not limited to comprising a PUR configuration. First, in action 410, UE is configured with PUR. The UE 'PUR time stamp' is set to $t_i$ in 420. Power saving state in between PUR transmissions may be entered in 430. Data arrival for PUR transmissions occurs in 440. 'PUR time stamp' $t_0$ is acquired in SI in 450. Thereafter, it is asked in 460 whether $t_i > t_0$. If yes, data is transmitted in PUR resource in 490. If no, PUR transmission is not allowed, action 470. Potentially, new PUR configuration may be requested, action 480.

FIG. 5 depicts an example embodiment of method 100 performed by a UE. The method begins at step 502 with responsive to receiving a broadcast from a base station, wherein the broadcast comprises an indication that the wireless device is not allowed to use a preconfigured resource configuration associated with the wireless device, determining that the wireless device is not allowed to use the preconfigured resource configuration. This corresponds to an embodiment of step 120 of the method 100 illustrated in FIG. 1a.

FIG. 6 depicts an example embodiment of method 200 performed by a base station. The method begins at step 602 with responsive to an event indicating that the base station should dis-allow any preconfigured resource configurations established prior to the indication, transmitting a broadcast from a base station, wherein the broadcast comprises an indication that the wireless device is not allowed to use a preconfigured resource configuration associated with the wireless device. This corresponds to an embodiment of step 240 of the method 200 illustrated in FIG. 2a.

In the embodiments depicted in FIGS. 5 and 6, an indication may be included in a broadcast message indicating that the UE is no longer allowed to use its PUR configuration. The indication may comprise a broadcasted flag indicating that the wireless device is not allowed to use the preconfigured resource configuration. The presence of this flag in the broadcast may indicate that the UE is not allowed to use its PUR configuration. The base station may, if it for example restarts, include this indication a certain time T after the restart and all wireless devices which detect the presence of the indication may not be allowed to use their PUR configurations. The time T may be chosen to be the maximum PUR periodicity, which is used in the network/by that base station. Therefore, it may be ensured that after e.g. a restart, all wireless devices would discard their PUR configurations. This approach is simple but it also means that PUR will be disabled for the time T following the event. For example, if the base station uses a PUR periodicity of 4 hours, the base station may include this indication in broadcast for 4 hours after a restart and hence, any wireless device which would earlier have been given a PUR configuration which would, at least based on the PUR configuration, otherwise have allowed for a PUR transmission within those 4 hours, would not be allowed to perform a PUR transmission due to the indication. For example, any PUR configuration configured before the flag was set may be disallowed, whereas any new PUR configuration provided after the flag is set (i.e. after eNB restart) would still be valid but would still be disallowed.

In some embodiments, the indication may comprise an absence of an indication that access to the base station by idle wireless devices using preconfigured resource configurations is enabled. In this example, the above procedure may be applied when the indication that PUR access is allowed in the cell is temporarily removed in the cell, i.e. the flag is implicit from temporary absence of the 'PUR enabled' indication. In this case, the new PUR configurations provided may not be valid until after the expiration of time period T.

Figure 7A:
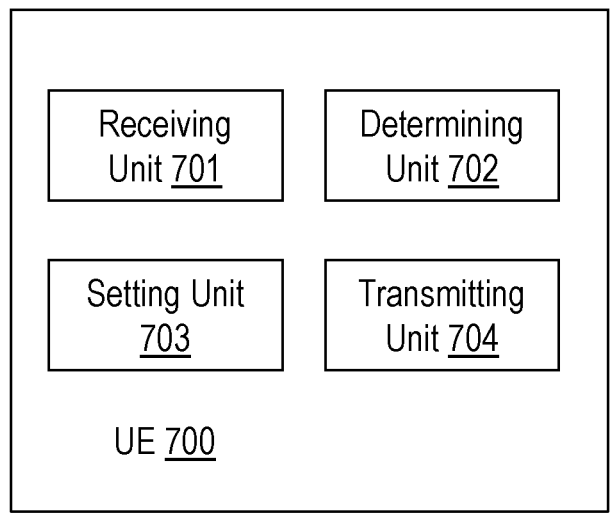
FIG. 7a-b are schematic drawings illustrating examples of a UE.
Figure 7B:
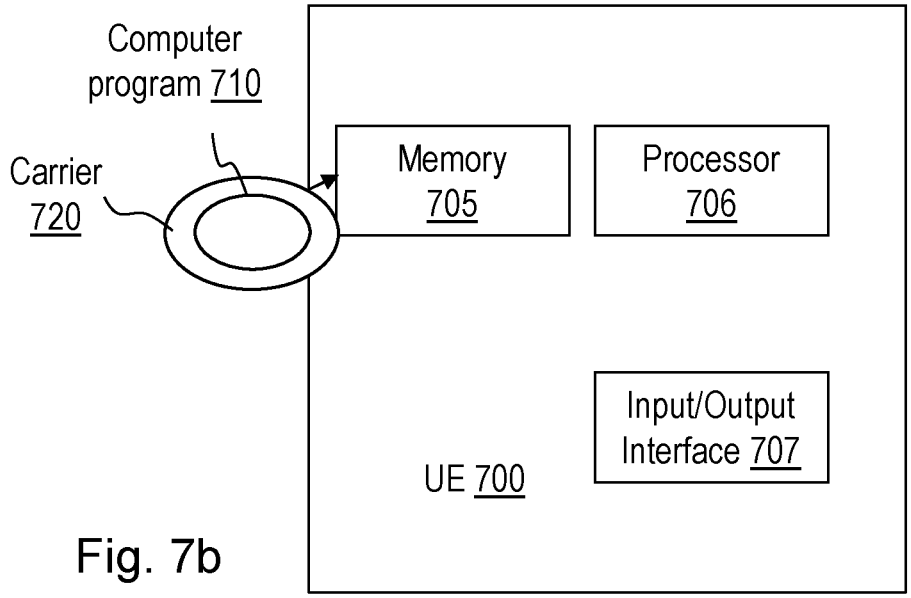

The present disclosure also provides a UE in a communications network. The UE is illustrated in FIGS. 7a and 7b and is configured to perform the method 100 described with reference to FIG. 1a.

In some embodiments, the UE 700 comprises a receiving unit 701 configured to receive a broadcast from a base station. The broadcast comprises an indication indicating whether the UE 700 is allowed to use a preconfigured resource configuration associated with the UE 700. The UE 700 further comprises a determining unit 702 configured to, based on the indication in the broadcast, determine whether the UE 700 is allowed to use the preconfigured resource configuration. The UE 700 may further comprise setting unit 703 and a transmitting unit 704 which are configured to perform the steps of the previously described method 100.

In some other embodiments, the UE 700 comprises a processor 706 and a memory 705. The memory 705 storing computer program code which, when run in the processor 706, causes the UE 700 to perform the method 100 described above. The UE 700 may further comprise an input/output interface 707.

Figure 8A:
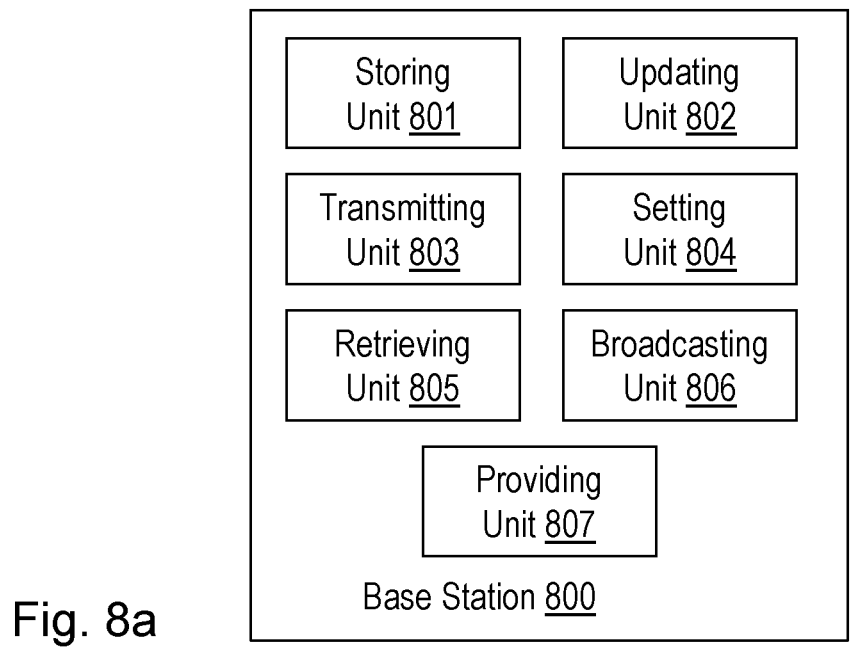
FIG. 8*a*-*b* are schematic drawings illustrating examples of a base station.
Figure 8B:
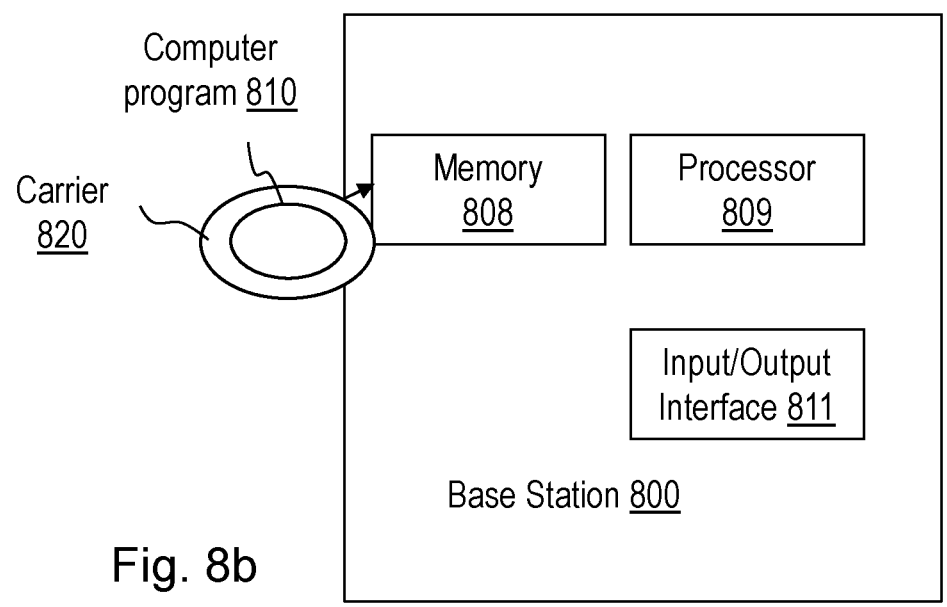

The present disclosure also provides a base station for communicating with a UE 700, wherein the UE 700 is configured to use a preconfigured resource configuration. The base station is illustrated in FIGS. 8a and 8b and is configured to perform the method 200 described with reference to FIG. 2a.

In some embodiments, the base station 800 comprises a broadcasting unit 806 configured to, responsive to an event indicating that the base station 800 should dis-allow any preconfigured resource configurations established prior to the indication, broadcasting an indication indicating that the UE 700 is not allowed to use the preconfigured resource configuration associated with the UE 700. The base station 800 may further comprise a storing unit 801, an updating unit 802, a transmitting unit 803, a setting unit 804, a retrieving unit 805 and a providing unit 807 which are configured to perform the steps of the previously described method 200.

In some other embodiments, the base station 800 comprises a processor 809 and a memory 808. The memory 808 storing computer program code which, when run in the processor 809, causes the base station 800 to perform the method 200 described above. The base station 800 may further comprise an input/output interface 811.

Generalizations

It herein states that a wireless device, or UE, is not allowed, or dis-allowed, to use its PUR configuration. There may be several ways of achieving this. For example, the UE may disable transmissions from the PUR configuration. Another approach is that the UE discards the PUR configuration.

Above it has been used as example that a UE has one preconfigured resource configuration. However, the embodiments can also be applied for scenarios where a UE has been provided with multiple preconfigured resource configurations. The UE may then apply the methods for each preconfigured resource configuration.

The embodiments described above has used the feature of PUR as example, but the embodiments can be applied for other types of configured resources.

While it has been used as an example that the base station is an eNB, i.e. an LTE base station, the embodiments are not limited to LTE but could also be used in other RATs, for example in NR.

In one embodiment of the invention, the presence of the 'PUR valueTag' or 'PUR time stamp' in system information can serve as an indication that PUR access is allowed in the cell. I.e., the network can remove this field to dis-allow PUR access from any UE in the cell.

If the UE, based on the above embodiments, has been dis-allowed to use a PUR configuration the UE may indicate this to the network. The indication may comprise some information of the PUR configuration, e.g. the periodicity, offset, etc. The eNB may use this information to provide a new PUR configuration for the UE.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 9:
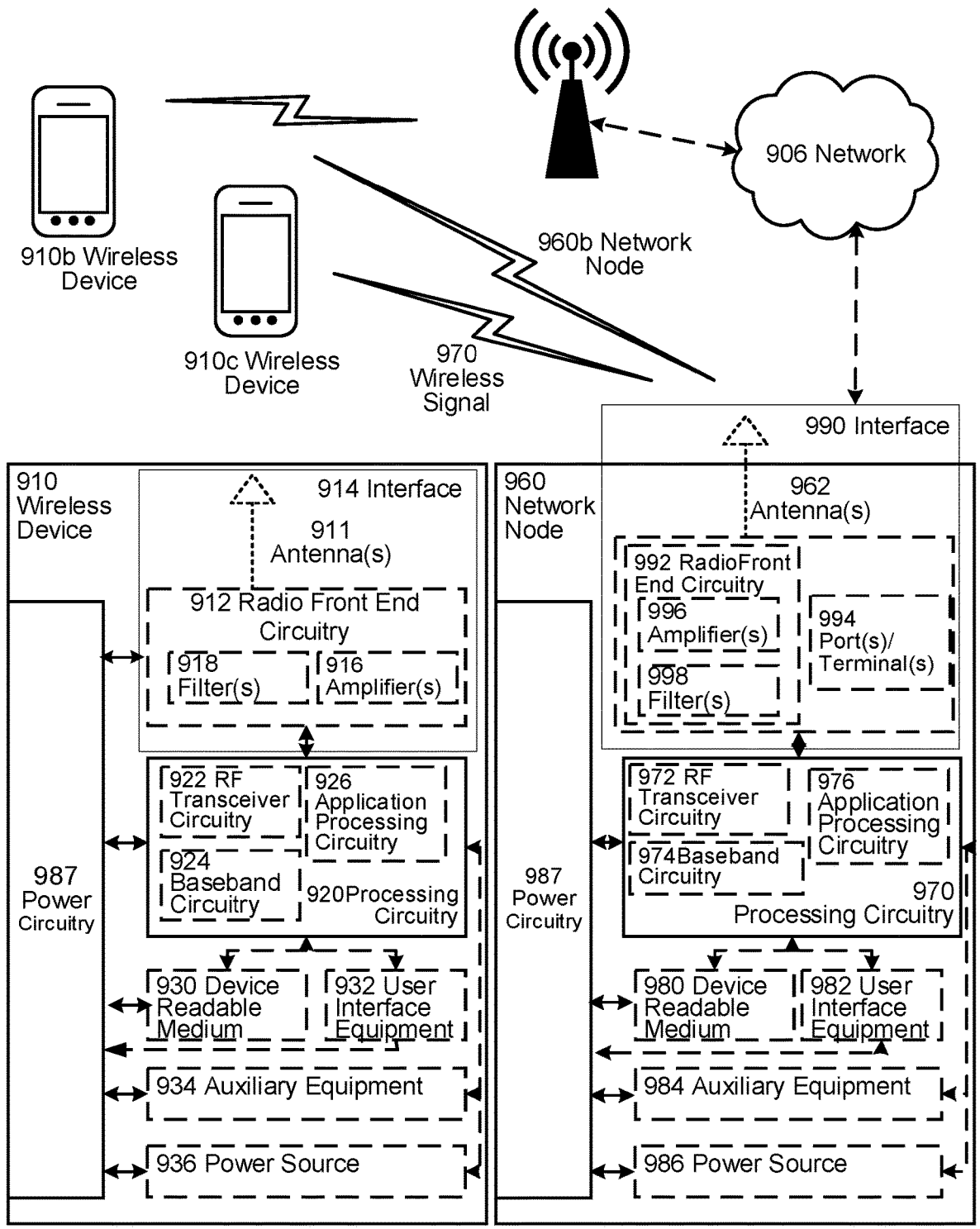
FIG. 9 illustrates an example wireless network.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network. The network nodes 960 and 960b may be configured to perform the methods as illustrated in FIGS. 2a and 6. The wireless device 910, 910b and 910c may be configured to perform the methods as illustrated in FIGS. 1a and 5.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band Internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
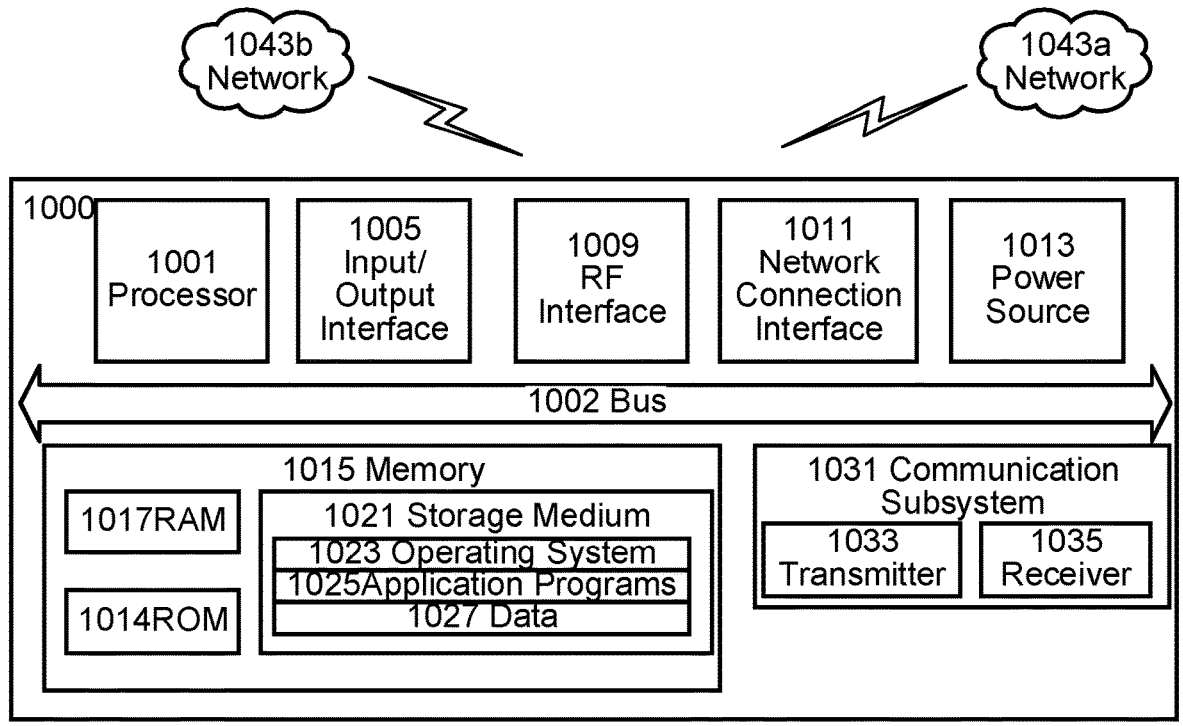
FIG. 10 shows a user equipment according to an embodiment.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043*a*. Network 1043*a* may encompass wired and/or wireless networks such as a local-area network (LAN), a wide-area network (WAN), a computer network, a wireless network, a telecommunications network, another like network or any combination thereof. For example, network 1043*a* may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
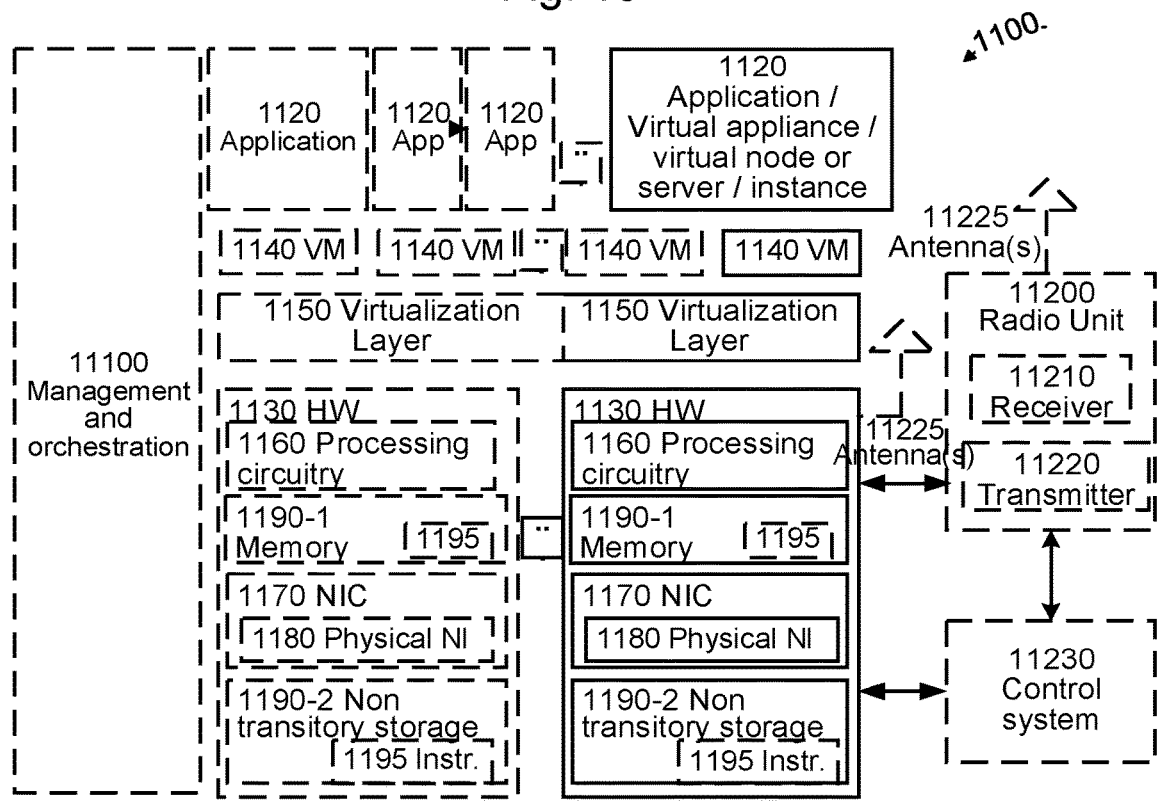
FIG. 11 shows a virtualization environment according to an embodiment.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
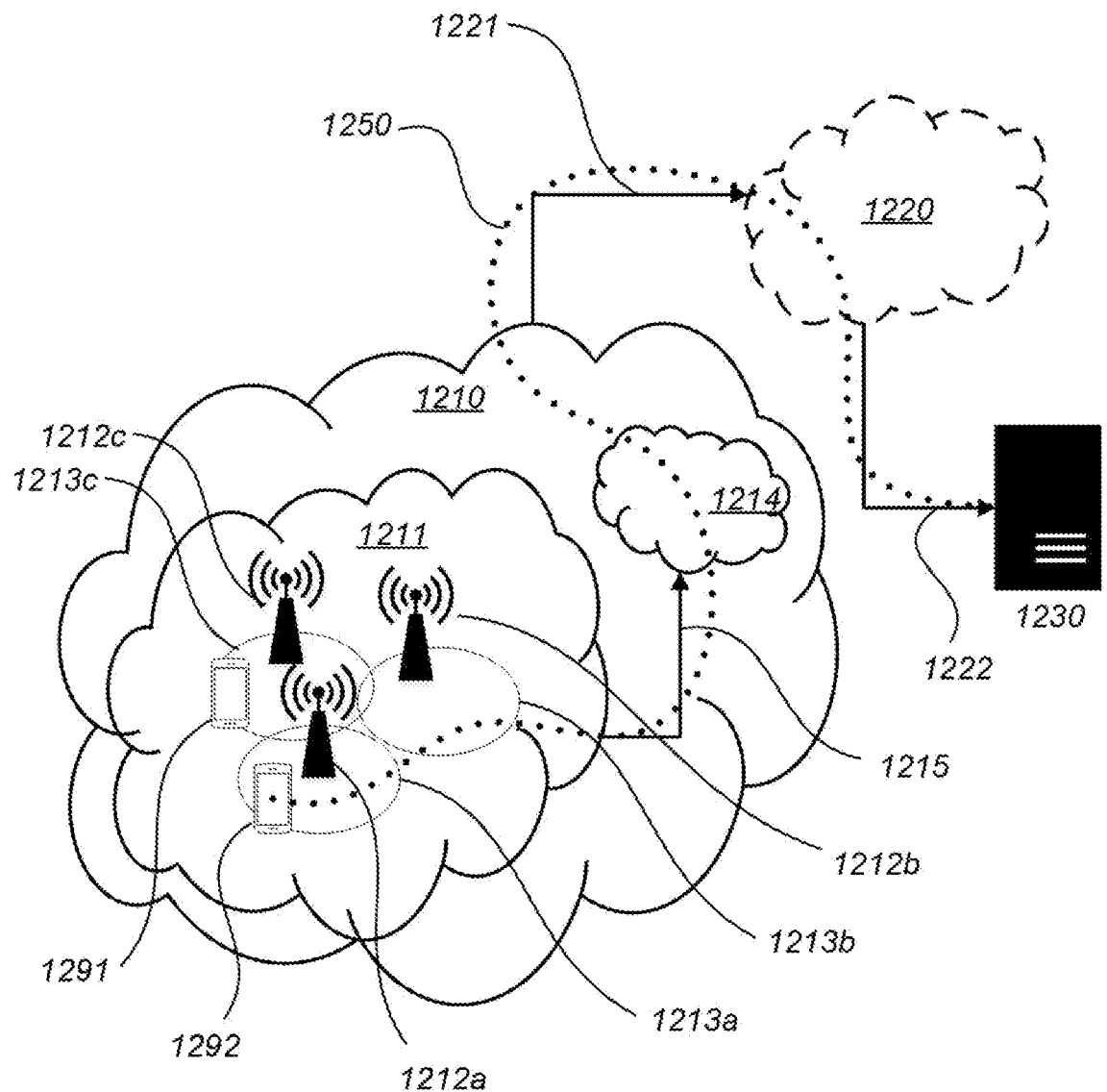
FIG. 12 illustrates an example telecommunication network connected via an intermediate network to a host computer.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
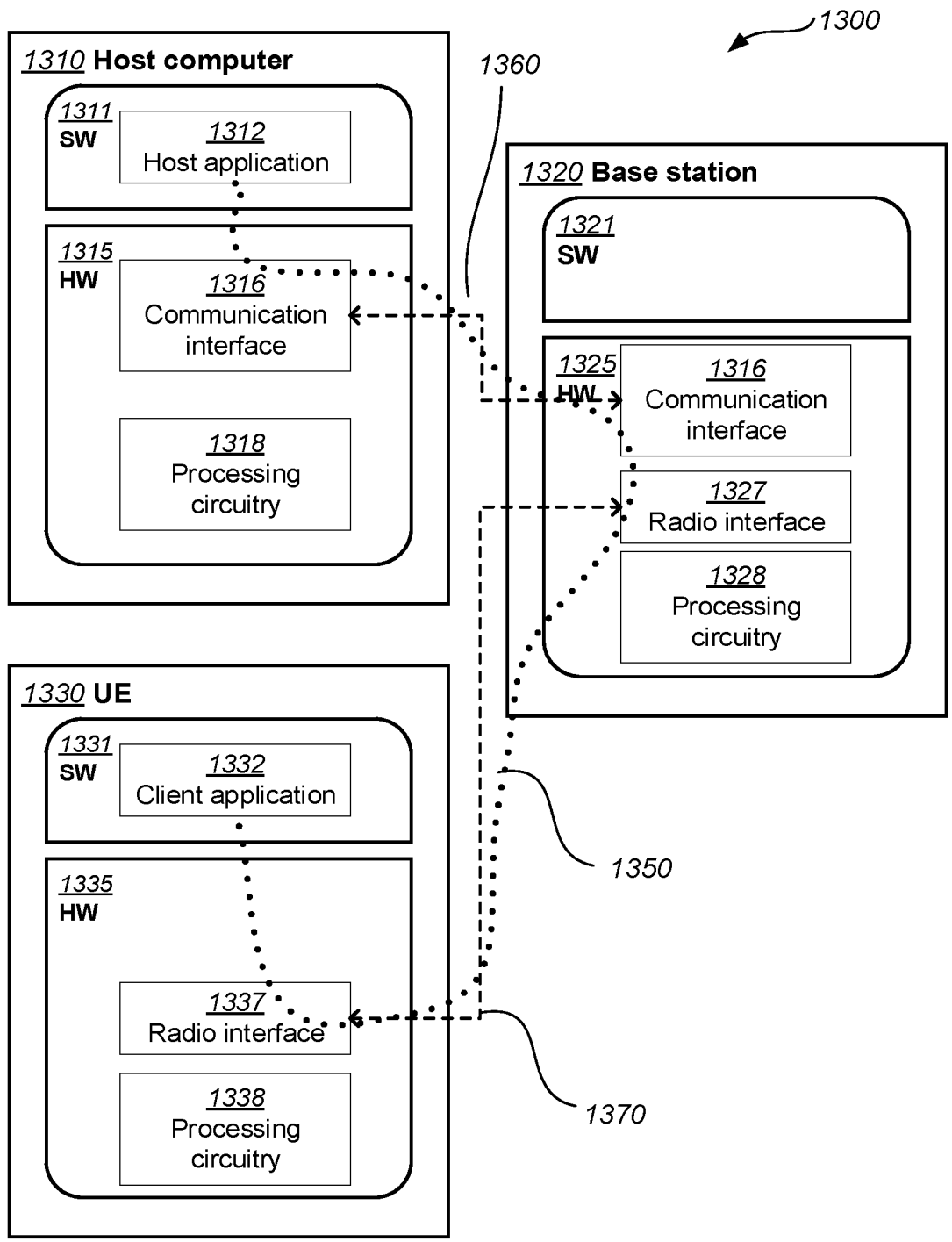
FIG. 13 shows a host computer communicating via a base station with a user equipment over a partially wireless connection according to an embodiment.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the reduced interference and thereby provide benefits such as improved user experience.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figures 14, 15:
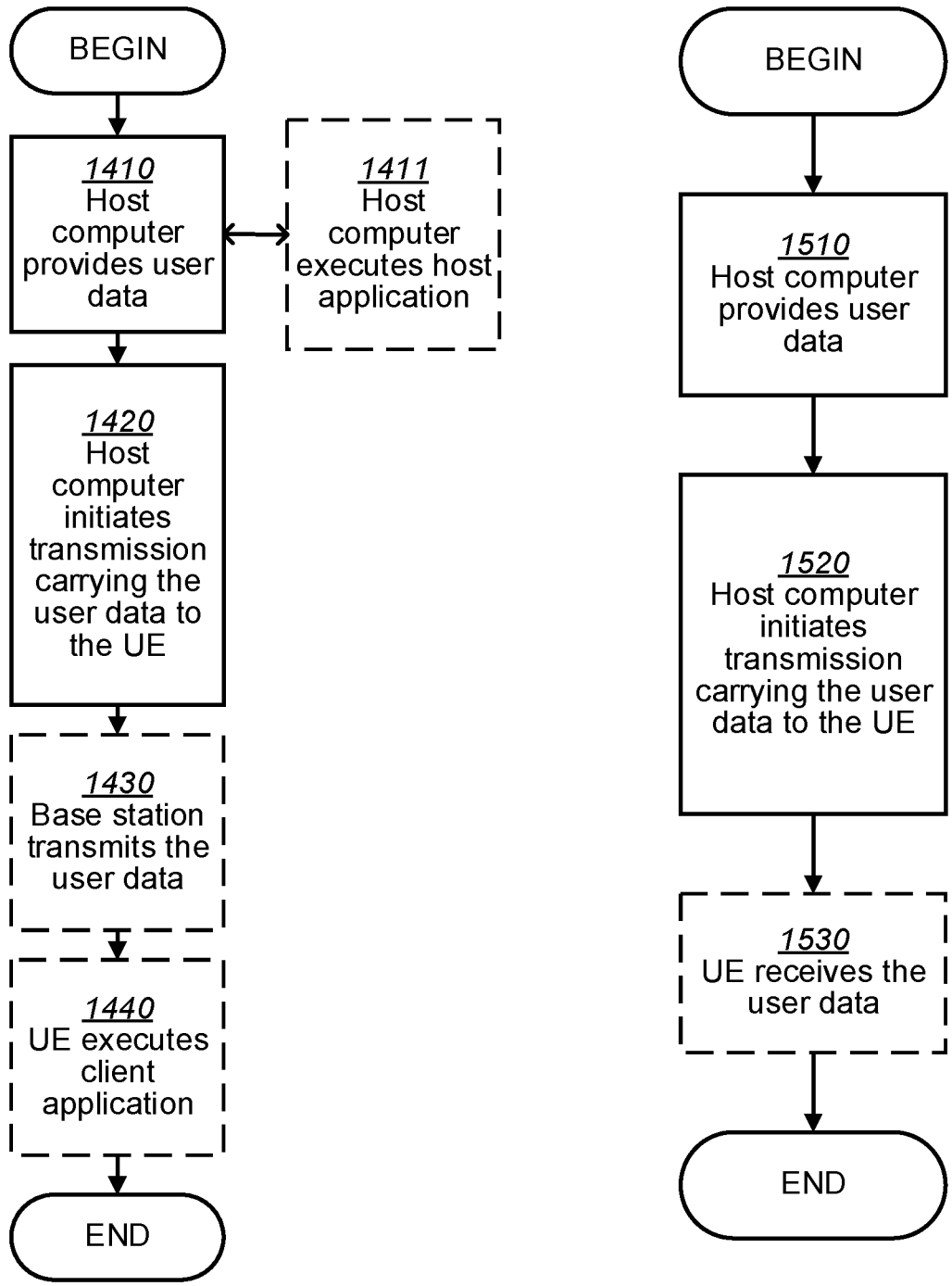
FIGS. 14 and 15 show example methods implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
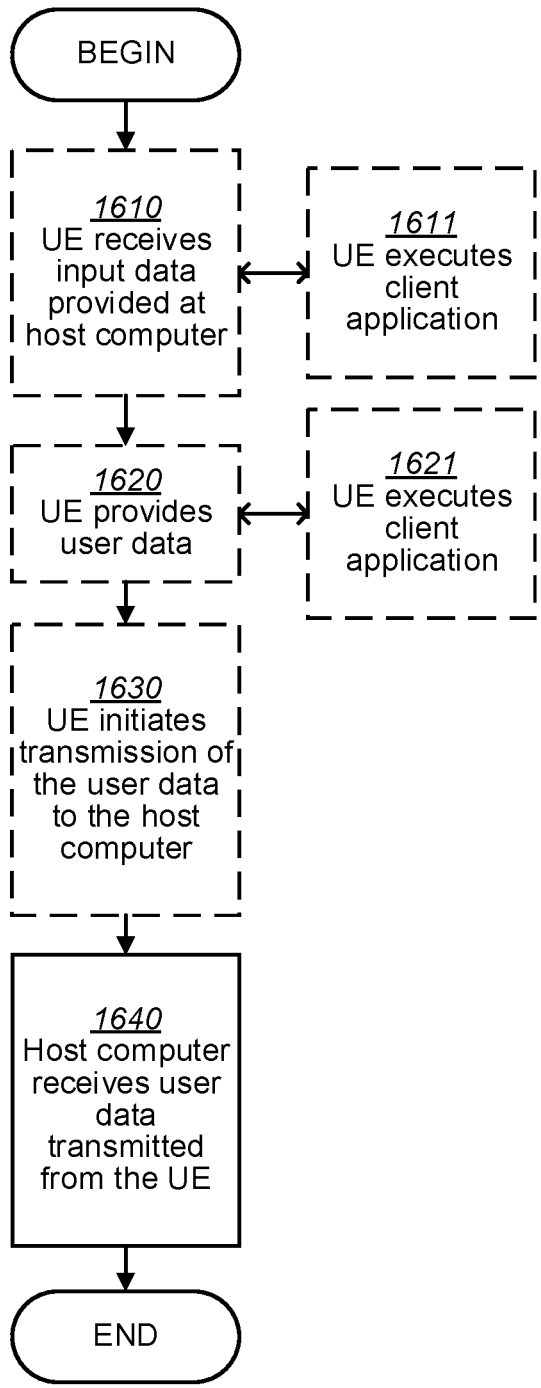
FIGS. 16 and 17 show example methods implemented in a communication system including a host computer, a base station and a user equipment is a schematic block diagram illustrating a telecommunication network connected via an intermediate network to a host computer.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
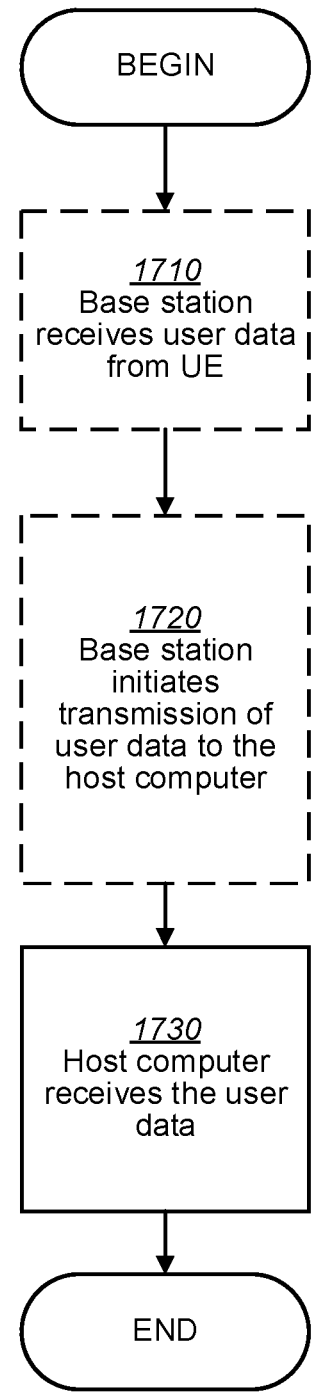

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
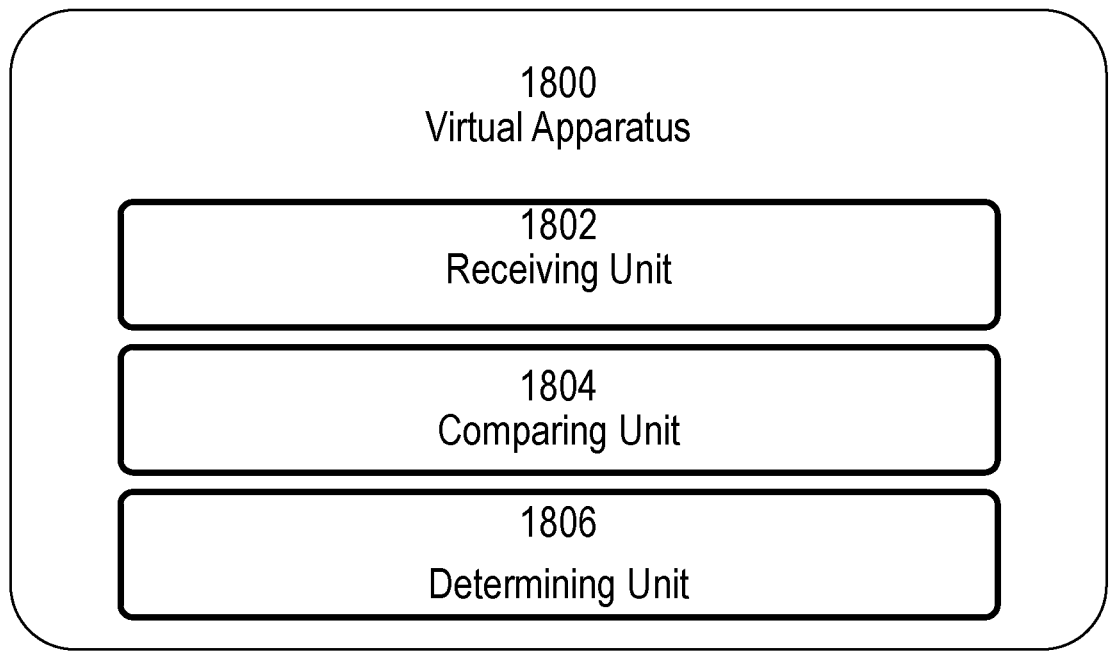
FIGS. 18-21 illustrate virtualization apparatuses in accordance with some embodiments.

FIG. 18 illustrates a schematic block diagram of an apparatus 1800 in a wireless network (for example, the wireless network shown in FIG. 9). The apparatus may be implemented in a wireless device (e.g., wireless device 910 shown in FIG. 9). Apparatus 1800 is operable to carry out the example method described with reference to FIG. 1*a* and possibly any other processes or methods disclosed herein. It is also to be understood that the method of FIG. 1*a* is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1802, comparing unit 1804, and determining unit 1806 and any other suitable units of apparatus 1800 to perform corresponding functions according one or more embodiments of the present disclosure.

As illustrated in FIG. 18, apparatus 1800 includes receiving unit 1802 configured to receive a first broadcast from a base station, wherein the first broadcast comprises a first broadcasted control value. Apparatus 1800 further comprises comparing unit 1804 configured to compare the first broadcasted control value to a first control value. Apparatus 1800 further comprises determining unit 1806 configured to based on the comparison, determine whether the wireless device is allowed to use a preconfigured resource configuration associated with the wireless device.

Figure 19:
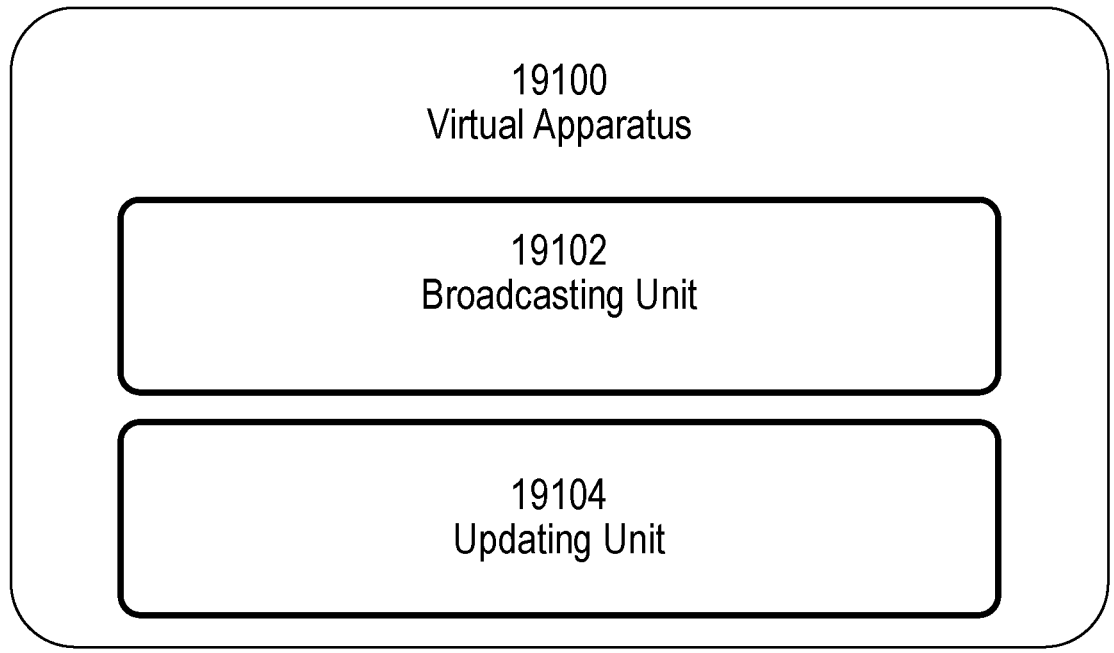

FIG. 19 illustrates a schematic block diagram of an apparatus 19100 in a wireless network (for example, the wireless network shown in FIG. 9). The apparatus may be implemented in a network node (e.g., network node 960 shown in FIG. 9). Apparatus 19100 is operable to carry out the example method described with reference to FIG. 2*a* and possibly any other processes or methods disclosed herein. It is also to be understood that the method of FIG. 2*a* is not necessarily carried out solely by apparatus 19100. At least some operations of the method can be performed by one or more other entities.

Virtual Apparatus 19100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 19102, comparing unit 19104, and determining unit 19106 and any other suitable units of apparatus 19100 to perform corresponding functions according one or more embodiments of the present disclosure.

As illustrated in FIG. 19, apparatus 19100 includes broadcasting unit 19102 configured to broadcast a broadcasted control value. Apparatus 19100 further comprises updating unit 19104 configured to responsive to an event indicating that the base station should dis-allow any preconfigured resource configurations established prior to the indication, update the broadcasted control value. Broadcasting unit 19102 is further configured to broadcast the updated the broadcasted control value.

Figure 20:
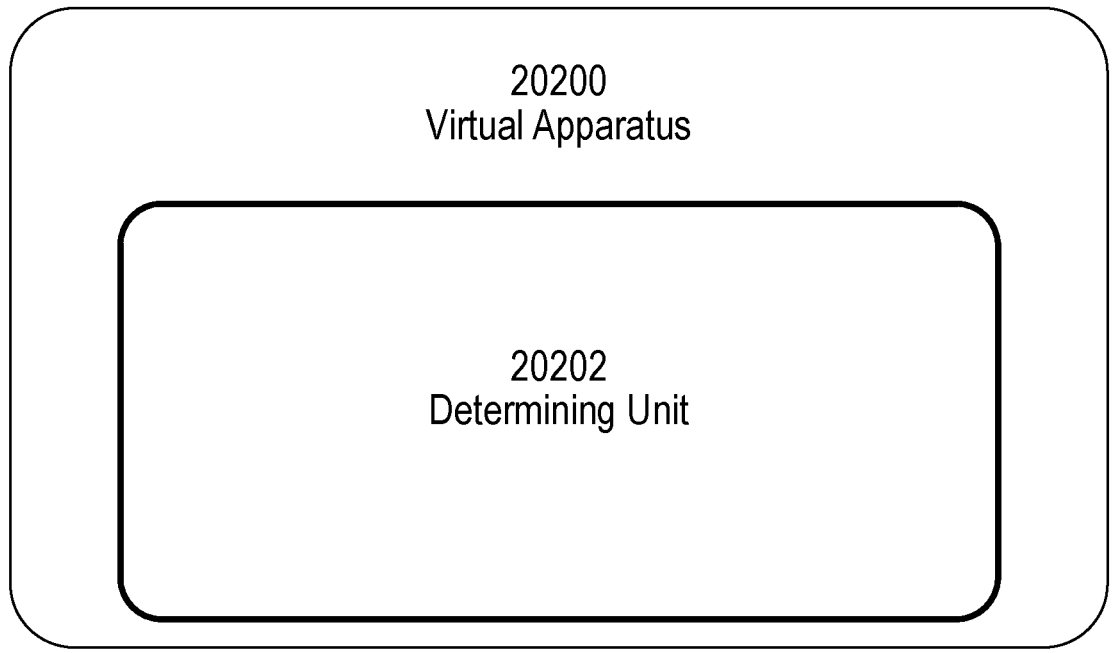

FIG. 20 illustrates a schematic block diagram of an apparatus 20200 in a wireless network (for example, the wireless network shown in FIG. 9). The apparatus may be implemented in a wireless device (e.g., wireless device 910 shown in FIG. 9). Apparatus 20200 is operable to carry out the example method described with reference to FIG. 5 and possibly any other processes or methods disclosed herein. It is also to be understood that the method of FIG. 5 is not necessarily carried out solely by apparatus 20200. At least some operations of the method can be performed by one or more other entities.

Virtual Apparatus 20200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 20202, comparing unit 20204, and determining unit 20206 and any other suitable units of apparatus 20200 to perform corresponding functions according one or more embodiments of the present disclosure. As illustrated in FIG. 20, apparatus 20200 includes determining unit 20202 configured to responsive to receiving a broadcast from a base station, wherein the broadcast comprises an indication that the wireless device is not allowed to use a preconfigured resource configuration associated with the wireless device, determine that the wireless device is not allowed to use the preconfigured resource configuration.

Figure 21:
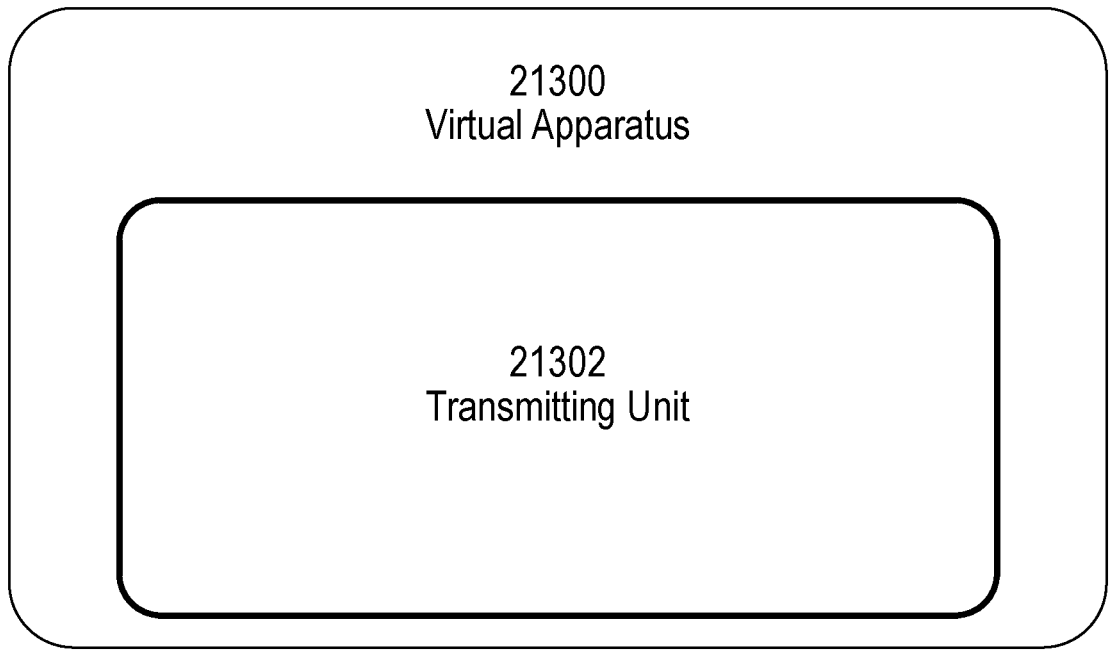

FIG. 21 illustrates a schematic block diagram of an apparatus 21300 in a wireless network (for example, the wireless network shown in FIG. 9). The apparatus may be implemented in a network node (e.g., network node 960 shown in FIG. 9). Apparatus 21300 is operable to carry out the example method described with reference to FIG. 6 and possibly any other processes or methods disclosed herein. It is also to be understood that the method of FIG. 6 is not necessarily carried out solely by apparatus 21300. At least some operations of the method can be performed by one or more other entities.

Virtual Apparatus 21300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 21302, comparing unit 21304, and determining unit 21306 and any other suitable units of apparatus 21300 to perform corresponding functions according one or more embodiments of the present disclosure.

As illustrated in FIG. 21, apparatus 21300 includes transmitting unit 21302 configured to responsive to an event indicating that the base station should dis-allow any preconfigured resource configurations established prior to the indication, transmit a broadcast from a base station, wherein the broadcast comprises an indication that the wireless device is not allowed to use a preconfigured resource configuration associated with the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a wireless device in a network, the method comprising:
    receiving a first broadcast from a base station, wherein the first broadcast comprises a first broadcasted control value;
    comparing the first broadcasted control value to a first control value, and
    based on the comparison, determining whether the wireless device is allowed to use a preconfigured resource configuration associated with the wireless device.
2. The method of embodiment 1 wherein the first broadcast comprises a system information broadcast.
3. The method of any previous embodiment wherein the step of comparing comprises:
    a. determining whether the first control value matches the first broadcasted control value; and
    b. responsive to the first control value not matching the first broadcasted control value, determining that the wireless device is not allowed to use the preconfigured resource configuration.
4. The method of embodiment 3 wherein the first broadcasted control value comprises a bit string.
5. The method of embodiment 1 or 2 wherein the first broadcasted control value comprises a first time stamp value and the first control value comprises a second time stamp value, and wherein the step of comparing comprises:
    a. determining whether the second time stamp value is newer than or equal to the first time stamp value, and
    b. responsive to the second time stamp value being older than the first time stamp value, determining that the wireless device is not allowed to use the preconfigured resource configuration.
6. The method of any preceding embodiment further comprising:
    a. upon configuration of the preconfigured resource configuration, setting the first control value as equivalent to a most recently received broadcasted control value or setting the first control value as a most recently broadcasted control value received as part of the preconfigured resource configuration.
7. The method of any preceding embodiment wherein, responsive to an absence of a second broadcasted control value in a second broadcast, determining that the wireless device is not allowed to use the preconfigured resource configuration.
8. The method of any preceding embodiment further comprising:
    a. responsive to determining that the wireless device is not allowed to use the preconfigured resource configuration, transmitting an indication to the network that the preconfigured resource configuration has been dis-allowed.
9. The method of any previous embodiment wherein the preconfigured resource configuration comprises a preconfigured uplink resource configuration.
10. A method performed by a wireless device, wherein the wireless device is operating in an idle mode of operation, the method comprising:
    a. responsive to receiving a broadcast from a base station, wherein the broadcast comprises an indication that the wireless device is not allowed to use a preconfigured resource configuration associated with the wireless device, determining that the wireless device is not allowed to use the preconfigured resource configuration.

11. The method of embodiment 10 wherein the indication comprises a broadcasted flag indicating that the wireless device is not allowed to use the preconfigured resource configuration.
12. The method of embodiment 10 wherein the indication comprises an absence of an indication that access to the base station by idle wireless devices using preconfigured resource configurations is enabled.
13. The method of any one of embodiments 10 to 12 wherein the preconfigured resource configuration comprises an preconfigured uplink resource configuration.
14. The method of any of the previous embodiments, further comprising:
providing user data; and
forwarding the user data to a host computer via the transmission to the base station.

Group B Embodiments

15. A method performed by a base station for communicating with a wireless device, wherein the wireless device is configured to use a preconfigured resource configuration, the method comprising:
broadcasting a broadcasted control value; and
responsive to an event indicating that the base station should dis-allow any preconfigured resource configurations established prior to the indication, updating the broadcasted control value; and
broadcasting the updated the broadcasted control value.
16. The method of embodiment 15 wherein the broadcasted control value is broadcast as part of a system information broadcast.
17. The method of embodiment 15 or 16 wherein the broadcasted control value comprises a bit string of length N where N is an integer.
18. The method of embodiment 17 further comprising storing the broadcasted control value in a non-volatile memory, and wherein the step of updating comprises:
a. setting the updated broadcasted control value to a value which is different from the stored broadcasted control value.
19. The method of embodiment 17 further comprising transmitting the broadcasted control value to a network node for storage, and wherein the step of updating comprises:
a. retrieving the broadcasted control value from the network node, and
b. setting the updated broadcasted control value to a value which is different from the stored broadcasted control value.
20. The method of embodiment 17 wherein the step of updating the broadcasted control value comprises selecting a random bit string of length N for the updated broadcasted control value.
21. The method of embodiment 15 or 17 wherein the broadcasted control value comprises a time stamp value and the updated broadcasted control value comprises a current time stamp value based on a time at which the event occurs.
22. The method of any one of embodiments 15 to 21 wherein the event comprises the base station restarting.
23. The method of any one of embodiments 15 to 21 wherein the event comprises the base station losing record of previous preconfigured resource configurations.
24. The method of any one of embodiments 15 to 23 wherein the preconfigured resource configuration comprises an preconfigured uplink resource configuration.
25. The method of any one of embodiments 15 to 24 further comprising:
a. upon configuration of the preconfigured resource configuration providing a most recently broadcasted control value as part of the preconfigured resource configuration.
26. A method, performed by a base station for communicating with a wireless device operating in an idle mode of operation, wherein the wireless device is configured to use a preconfigured resource configuration, the method comprising:
responsive to an event indicating that the base station should dis-allow any preconfigured resource configurations established prior to the indication, transmitting a broadcast from a base station, wherein the broadcast comprises an indication that the wireless device is not allowed to use a preconfigured resource configuration associated with the wireless device.
27. The method of embodiment 26 wherein the indication comprises a broadcasted flag indicating that the wireless device is not allowed to use the preconfigured resource configuration.
28. The method of embodiment 27 wherein the indication comprises an absence of an indication that access to the base station by idle wireless devices using preconfigured resource configurations is enabled.
29. The method of any one of embodiments 26 to 28 wherein the event comprises the base station restarting.
30. The method of any one of embodiments 26 to 28 wherein the event comprises the base station losing record of previous preconfigured resource configurations.
31. The method of any one of embodiments 26 to 30 wherein the preconfigured resource configuration comprises an preconfigured uplink resource configuration.
32. The method of any of the previous embodiments, further comprising:
obtaining user data; and
forwarding the user data to a host computer or a wireless device.

Group C Embodiments

33. A wireless device for operating in an idle mode of operation, the wireless device comprising:
processing circuitry configured to perform any of the steps of any of the Group A embodiments; and
power supply circuitry configured to supply power to the wireless device.
34. A base station for communicating with a wireless device operating in an idle mode of operation, wherein the wireless device is configured to use a preconfigured resource configuration, the base station comprising:
processing circuitry configured to perform any of the steps of any of the Group B embodiments;
power supply circuitry configured to supply power to the base station.
35. A user equipment (UE) for operating in an idle mode of operation, the UE comprising:
an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

36. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

37. The communication system of the previous embodiment further including the base station.

38. The communication system of the previous 2 embodiments, further including the UE, wherein the UE is configured to communicate with the base station.

39. The communication system of the previous 3 embodiments, wherein:

the processing circuitry of the host computer is configured to execute a host application, thereby providing the user data; and the UE comprises processing circuitry configured to execute a client application associated with the host application.

40. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

41. The method of the previous embodiment, further comprising, at the base station, transmitting the user data.

42. The method of the previous 2 embodiments, wherein the user data is provided at the host computer by executing a host application, the method further comprising, at the UE, executing a client application associated with the host application.

43. A user equipment (UE) configured to communicate with a base station, the UE comprising a radio interface and processing circuitry configured to performs the of the previous 3 embodiments.

44. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

45. The communication system of the previous embodiment, wherein the cellular network further includes a base station configured to communicate with the UE.

46. The communication system of the previous 2 embodiments, wherein:

the processing circuitry of the host computer is configured to execute a host application, thereby providing the user data; and the UE's processing circuitry is configured to execute a client application associated with the host application.

47. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

48. The method of the previous embodiment, further comprising at the UE, receiving the user data from the base station.

49. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

50. The communication system of the previous embodiment, further including the UE.

51. The communication system of the previous 2 embodiments, further including the base station, wherein the base station comprises a radio interface configured to communicate with the UE and a communication interface configured to forward to the host computer the user data carried by a transmission from the UE to the base station.

52. The communication system of the previous 3 embodiments, wherein:

the processing circuitry of the host computer is configured to execute a host application; and the UE's processing circuitry is configured to execute a client application associated with the host application, thereby providing the user data.

53. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

54. A method implemented in a communication system including a host computer, a base station and a user equipment (UE), the method comprising:

at the host computer, receiving user data transmitted to the base station from the UE, wherein the UE performs any of the steps of any of the Group A embodiments.

55. The method of the previous embodiment, further comprising, at the UE, providing the user data to the base station.

56. The method of the previous 2 embodiments, further comprising:
    at the UE, executing a client application, thereby providing the user data to be transmitted; and
    at the host computer, executing a host application associated with the client application.

57. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

58. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

59. The communication system of the previous embodiment further including the base station.

60. The communication system of the previous 2 embodiments, further including the UE, wherein the UE is configured to communicate with the base station.

61. The communication system of the previous 3 embodiments, wherein:
    the processing circuitry of the host computer is configured to execute a host application;
    the UE is configured to execute a client application associated with the host application, thereby providing the user data to be received by the host computer.

62. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.

63. The method of the previous embodiment, further comprising at the base station, receiving the user data from the UE.

64. The method of the previous 2 embodiments, further comprising at the base station, initiating a transmission of the received user data to the host computer.

REFERENCES

[LTE-M-WID] 3GPP, Tdoc RP-181878, "Revised WID: Additional MTC enhancements for LTE"
[NB-IoT-WID] 3GPP, Tdoc RP-181674, "WID revision: Additional enhancements for NB-IoT"
[TS36.331] 3GPP, TS 36.331, "RRC protocol specification"; v15.2.2, June 2018.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3$^{rd}$ Generation Partnership Project
BI Backoff Indicator
Cat-M1 Category M1
Cat-M2 Category M2
CE Coverage Enhanced/Enhancement
DL Downlink
EAB Extended Access Barring
eMTC enhanced Machine-Type Communications
eNB Evolved NodeB
IoT Internet of Things
LTE Long-Term Evolution
LTE-M Long-Term Evolution for Machine-Type Communications
LTE-MTC Long-Term Evolution for Machine-Type Communications
MAC Medium Access Control
NAS Non-Access Stratum
NB-IoT Narrowband Internet of Things
M2M Machine-to-Machine
MTC Machine-Type Communications
PUR Preconfigured Uplink Resources
(N)PRACH (Narrowband) Physical Random Access Channel
PRB Physical Resource Block
RA Random Access
RAPID Random Access Preamble IDentifier
RAR Random Access Response
RNTI Radio Network Temporary Identifier
RRC Radio Resource Control (protocol)
UE User Equipment
UL Uplink
1×RTT CDMA2000 1× Radio Transmission Technology
5G 5th Generation
ARQ Automatic Repeat Request
CA Carrier Aggregation
CC Carrier Component
CDMA Code Division Multiplexing Access
CGI Cell Global Identifier
CIR Channel Impulse Response
CQI Channel Quality information
DCCH Dedicated Control Channel
DM Demodulation
DMRS Demodulation Reference Signal
DRX Discontinuous Reception
DTX Discontinuous Transmission
E-CID Enhanced Cell-ID (positioning method)
E-SMLC Evolved-Serving Mobile Location Centre
eNB E-UTRAN NodeB
ePDCCH enhanced Physical Downlink Control Channel
E-UTRA Evolved UTRA
E-UTRAN Evolved UTRAN
FDD Frequency Division Duplex
FFS For Further Study
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
MBMS Multimedia Broadcast Multicast Services
MBSFN Multimedia Broadcast multicast service Single Frequency Network
MBSFN ABS MBSFN Almost Blank Subframe MDT Minimization of Drive Tests
MIB Master Information Block
MME Mobility Management Entity
MSC Mobile Switching Center
NPDCCH Narrowband Physical Downlink Control Channel
NR New Radio
OFDM Orthogonal Frequency Division Multiplexing
OFDMA Orthogonal Frequency Division Multiple Access
OSS Operations Support System
PBCH Physical Broadcast Channel
P-CCPCH Primary Common Control Physical Channel
PCell Primary Cell
PDCCH Physical Downlink Control Channel
PDSCH Physical Downlink Shared Channel
PGW Packet Gateway
PHICH Physical Hybrid-ARQ Indicator Channel
PLMN Public Land Mobile Network
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
RAN Radio Access Network
RAT Radio Access Technology
RLM Radio Link Management
RNC Radio Network Controller
RRM Radio Resource Management
RS Reference Signal
SCH Synchronization Channel
SCell Secondary Cell
SC-FDMA Single Carrier Frequency Division Multiple Access
SDU Service Data Unit
SGW Serving Gateway
SIB System Information Block
SNR Signal to Noise Ratio
SON Self Optimized Network
SS Synchronization Signal
SSS Secondary Synchronization Signal
TDD Time Division Duplex
TSS Tertiary Synchronization Signal
TTI Transmission Time Interval
UMTS Universal Mobile Telecommunication System
USIM Universal Subscriber Identity Module
UTRA Universal Terrestrial Radio Access
UTRAN Universal Terrestrial Radio Access Network
WCDMA Wide CDMA
WLAN Wide Local Area Network

The invention claimed is:

1. A method performed by a User Equipment (UE) in a communications network, the method comprising:
receiving a broadcast from a base station, wherein the broadcast comprises an indication indicating whether the UE is allowed to use a preconfigured resource configuration associated with the UE; and
determining, based on the indication in the broadcast, whether the UE is allowed to use the preconfigured resource configuration,
wherein the indication indicating whether the UE is allowed to use the preconfigured resource configuration associated with the UE is a first broadcasted control value and wherein the step of determining whether the UE is allowed to use the preconfigured resource configuration further comprises:
comparing the first broadcasted control value to a first control value, wherein the first broadcasted control value comprises a first time stamp value and the first control value comprises a second time stamp value, wherein the second time stamp value is a time the UE was configured with the preconfigured resource configuration;
determining whether the second time stamp value is newer than, or equal to, the first time stamp value, and
responsive to the second time stamp value being older than the first time stamp value, determining that the UE is not allowed to use the preconfigured resource configuration, wherein the first time stamp value comprises a current time stamp value based on a time at which an event occurs at the base station.

2. The method according to claim 1, wherein the first control value is a control value stored in the UE.

3. The method according to claim 1, wherein the first-broadcast comprises a system information broadcast.

4. The method according to claim 1, wherein the first broadcasted control value comprises a bit string.

5. The method according to claim 1, wherein the method further comprises:
upon configuration of the preconfigured resource configuration, setting the first control value as equivalent to a most recently received broadcasted control value or setting the first control value as a most recently broadcasted control value received as part of the preconfigured resource configuration.

6. The method of claim 1, wherein the method further comprises:
responsive to determining that the UE is not allowed to use the preconfigured resource configuration, transmitting an indication to the network that the preconfigured resource configuration has been dis-allowed.

7. The method according to claim 1, wherein the preconfigured resource configuration comprises a preconfigured uplink resource configuration.

8. The method according to claim 1, wherein the UE is operating in an idle mode of operation in Long Term Evolution (LTE) or in an inactive mode of operation in New Radio (NR).

9. A method performed by a base station for communicating with a User Equipment (UE), wherein the UE is configured to use a preconfigured resource configuration, the method comprising:
responsive to an event indicating that the base station should dis-allow any preconfigured resource configurations established prior to the indication, broadcasting an indication indicating that the UE is not allowed to use the preconfigured resource configuration associated with the UE,
wherein the indication is a first broadcasted control value comprising a first time stamp value, wherein the first time stamp value comprises a current time stamp value based on a time at which the event occurs at the base station.

10. The method according to claim 9, wherein the method further comprises:
responsive to the event indicating that the base station should dis-allow any preconfigured resource configurations established prior to the indication, updating the first broadcasted control value, wherein the first broadcasted control value is an updated control value.

11. A User Equipment (UE) for use in a communications network, wherein the UE is configured to:
- receive a broadcast from a base station, wherein the broadcast comprises an indication indicating whether the UE is allowed to use a preconfigured resource configuration associated with the UE; and
- determine, based on the indication in the broadcast, whether the UE is allowed to use the preconfigured resource configuration,
- wherein the indication indicating whether the UE is allowed to use the preconfigured resource configuration associated with the UE is a first broadcasted control value and wherein the step of determining whether the UE is allowed to use the preconfigured resource configuration further comprises:
  - comparing the first broadcasted control value to a first control value, wherein the first broadcasted control value comprises a first time stamp value and the first control value comprises a second time stamp value, wherein the second time stamp value is a time the UE was configured with the preconfigured resource configuration;
  - determining whether the second time stamp value is newer than, or equal to, the first time stamp value, and
  - responsive to the second time stamp value being older than the first time stamp value, determining that the UE is not allowed to use the preconfigured resource configuration, wherein the first time stamp value comprises a current time stamp value based on a time at which an event occurs at the base station.

12. A base station for communicating with a User Equipment (UE), wherein the UE is configured to use a preconfigured resource configuration and wherein the base station is configured to:
- responsive to an event indicating that the base station should dis-allow any preconfigured resource configurations established prior to the indication, broadcast an indication indicating that the UE is not allowed to use the preconfigured resource configuration associated with the UE,
- wherein the indication is a first broadcasted control value comprising a first time stamp value, wherein the first time stamp value comprises a current time stamp value based on a time at which the event occurs at the base station.

* * * * *